(12) United States Patent
Onodera

(10) Patent No.: US 11,697,292 B2
(45) Date of Patent: Jul. 11, 2023

(54) CONVEYANCE DEVICE, LIQUID DISCHARGE APPARATUS, AND POST-PROCESSING APPARATUS

(71) Applicant: Ken Onodera, Kanagawa (JP)

(72) Inventor: Ken Onodera, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 3 days.

(21) Appl. No.: 17/582,019

(22) Filed: Jan. 24, 2022

(65) Prior Publication Data
US 2022/0281233 A1 Sep. 8, 2022

(30) Foreign Application Priority Data
Mar. 2, 2021 (JP) .................. 2021-032666

(51) Int. Cl.
*B41J 11/00* (2006.01)
*B41J 29/377* (2006.01)

(52) U.S. Cl.
CPC ......... *B41J 11/0022* (2021.01); *B41J 29/377* (2013.01)

(58) Field of Classification Search
CPC .. B41J 11/0022; B41J 29/377; B41J 11/0024; F26B 3/20; F26B 13/18; Y02P 70/10
See application file for complete search history.

(56) References Cited

U.S. PATENT DOCUMENTS

| 6,442,360 | B1 | 8/2002 | Onodera et al. |
| 2011/0076069 | A1 | 3/2011 | Yagawara et al. |
| 2011/0222890 | A1* | 9/2011 | Kikushima ........ G03G 15/2017 |
| | | | 399/92 |
| 2015/0174921 | A1 | 6/2015 | Onodera et al. |
| 2017/0266991 | A1 | 9/2017 | Onodera et al. |
| 2017/0334217 | A1 | 11/2017 | Yoshinuma et al. |
| 2018/0009237 | A1 | 1/2018 | Sakamoto et al. |
| 2018/0264843 | A1 | 9/2018 | Satoru et al. |
| 2018/0264849 | A1 | 9/2018 | Satoshi et al. |
| 2019/0084320 | A1 | 3/2019 | Iwasaki et al. |
| 2019/0100031 | A1 | 4/2019 | Nishimura et al. |
| 2020/0001622 | A1 | 1/2020 | Kitaoka et al. |
| 2020/0207119 | A1 | 7/2020 | Kawarada et al. |

FOREIGN PATENT DOCUMENTS

JP 2017-090007 5/2017

* cited by examiner

*Primary Examiner* — Bradley W Thies
(74) *Attorney, Agent, or Firm* — Xsensus LLP

(57) ABSTRACT

A conveyance device includes a conveyor having an outer face that contacts a sheet adhered with liquid. The conveyor conveys the sheet. A heat radiator generates air. A ventilator sends the air to the outer face of the conveyor.

20 Claims, 14 Drawing Sheets

CONVEYANCE DEVICE, LIQUID DISCHARGE APPARATUS, AND POST-PROCESSING APPARATUS

CROSS-REFERENCE TO RELATED APPLICATION

This patent application is based on and claims priority pursuant to 35 U.S.C. § 119(a) to Japanese Patent Application No. 2021-032666, filed on Mar. 2, 2021, in the Japan Patent Office, the entire disclosure of which is hereby incorporated by reference herein.

BACKGROUND

Technical Field

Exemplary aspects of the present disclosure relate to a conveyance device, a liquid discharge apparatus, and a post-processing apparatus, and more particularly, to a conveyance device, a liquid discharge apparatus incorporating the conveyance device, and a post-processing apparatus incorporating the conveyance device.

Discussion of the Background Art Related-art liquid discharge apparatuses, such as copiers, facsimile machines, printers, and multifunction peripherals (MFP) having two or more of copying, printing, scanning, facsimile, plotter, and other functions, typically discharge liquid onto a recording medium such as a sheet.

Such liquid discharge apparatuses include a conveyance device that conveys the sheet. The conveyance device includes a conveyor such as a roller and a belt.

SUMMARY

This specification describes below an improved conveyance device. In one embodiment, the conveyance device includes a conveyor having an outer face that contacts a sheet adhered with liquid. The conveyor conveys the sheet. A heat radiator generates air. A ventilator sends the air to the outer face of the conveyor.

This specification further describes an improved liquid discharge apparatus. In one embodiment, the liquid discharge apparatus includes a liquid discharger that discharges liquid onto a sheet and the conveyance device described above that conveys the sheet.

This specification further describes an improved post-processing apparatus. In one embodiment, the post-processing apparatus includes the conveyance device described above that conveys a sheet and a post-processing device that performs post-processing on the sheet conveyed from the conveyance device.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 3 is a cross-sectional view of the image forming apparatus depicted in FIG. 1 taken on a cross section in a direction perpendicular to a surface of the paper on which FIG. 1 is drawn;

Figure 1:
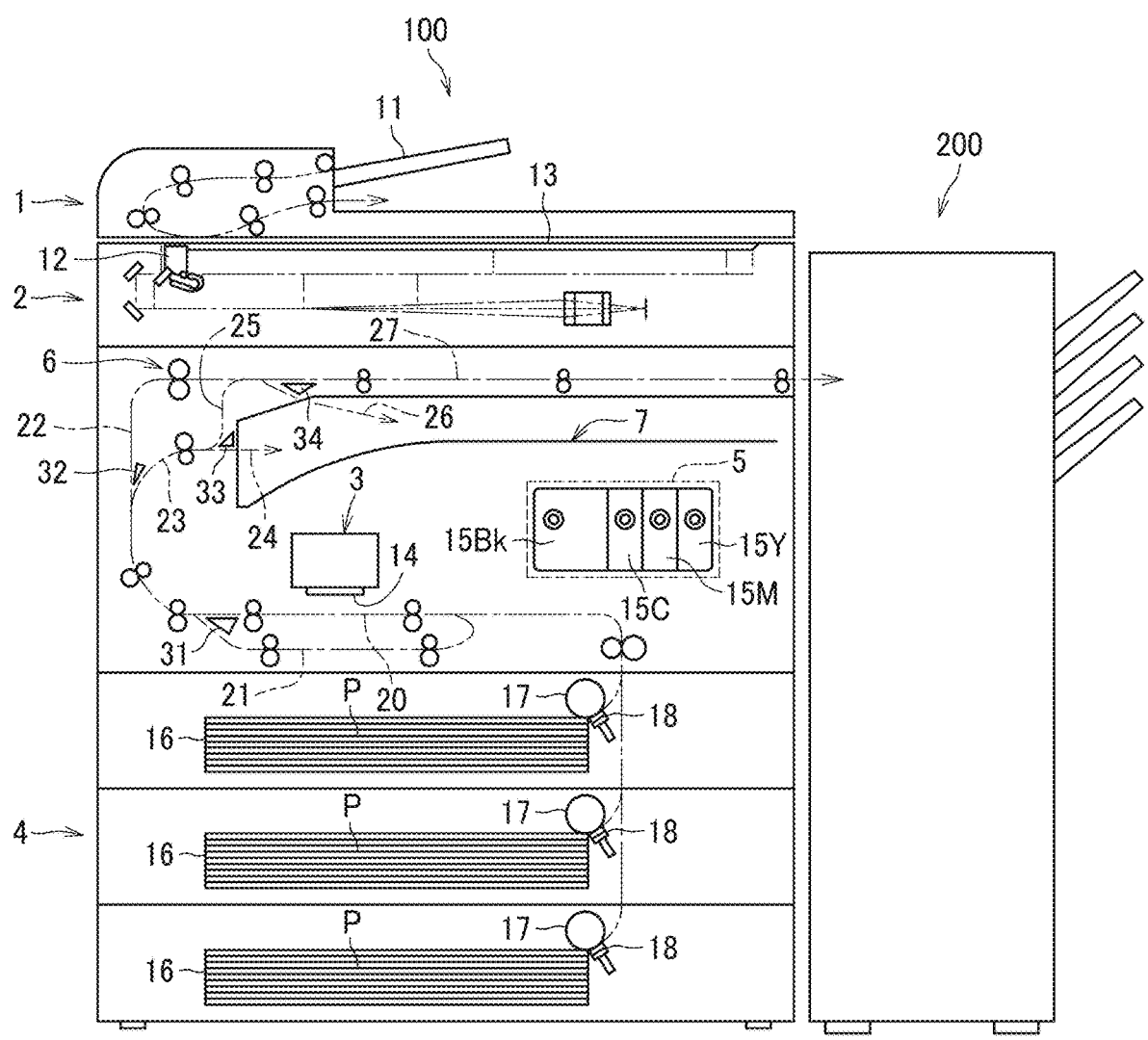
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring to the attached drawings, the following describes embodiments of the present disclosure.

In the drawings for explaining the embodiments of the present disclosure, identical reference numerals are assigned to elements such as members and parts that have an identical function or an identical shape as long as differentiation is possible and a description of those elements is omitted once the description is provided.

FIG. 1 is a schematic cross-sectional view of an image forming apparatus 100 according to an embodiment of the present disclosure.

As illustrated in FIG. 1, the image forming apparatus 100 according to this embodiment includes an original conveyance device 1, a scanner 2, an image forming device 3, a sheet supply 4, a cartridge holder 5, and a sheet ejection portion 7. A post-processing apparatus 20 (e.g., a finisher) is disposed beside the image forming apparatus 100.

The original conveyance device 1 separates an original from other originals placed on an original tray 11 and conveys the original to an exposure glass 13 of the scanner 2. The original conveyance device 1 includes a plurality of conveyance rollers serving as original conveyors that convey the original.

The scanner 2 reads an image on an original placed on the exposure glass 13 by a user or an image on the original that is conveyed from the original conveyance device 1 and passes over the exposure glass 13. The scanner 2 includes an optical scanning unit 12 serving as an image reading portion that reads the image on the original. The optical scanning unit 12 includes a light source and a charge-coupled device (CCD). The light source irradiates the original on the exposure glass 13 with light. The CCD serves as an image reader that reads the image on the original with reflected light reflected by the original. Alternatively, a contact image sensor (CIS) or the like may be used as the image reader.

The image forming device 3 includes a plurality of liquid discharge heads 14 serving as a liquid discharger that discharges liquid, for example, ink, onto a sheet P. The liquid discharge heads 14 may employ a serial type system in which the liquid discharge heads 14 discharge ink while the liquid discharge heads 14 move in a main scanning direction (e.g., a width direction of the sheet P). Alternatively, the liquid discharge heads 14 may employ a line type system in which the plurality of liquid discharge heads 14 stationarily arranged in the main scanning direction discharges ink.

The cartridge holder 5 is removably mounted with a plurality of ink cartridges 15Y, 15M, 15C, and 15Bk. The ink cartridges 15Y 15M, 15C, and 15Bk are replenished with ink in different colors, for example, yellow, magenta, cyan, and black, respectively. Liquid feed pumps supply ink to the liquid discharge heads 14 from the ink cartridges 15Y, 15M, 15C, and 15Bk, respectively.

The sheet supply 4 includes a plurality of sheet trays 16 serving as sheet storages, respectively. Each of the sheet trays 16 loads, as a sheet P onto which an image is to be formed, cut paper cut into a sheet having a predetermined size in a sheet conveyance direction such as an A4 size and a B4 size in advance. Each of the sheet trays 16 is mounted with a feed roller 17 serving as a sheet feeder that feeds the sheet P and a separation pad 18 serving as a sheet separator that separates the sheet P from other sheets P.

The post-processing apparatus 200 performs post-processing such as alignment on the sheets P sent from the image forming apparatus 100. The post-processing apparatus 200X includes, as a post-processing portion, a sheet aligner that aligns and ejects the plurality of sheets P. Alternatively, the post-processing portion may be a punch that cuts holes in the sheet P, a stapler that staples the plurality of sheets P, a folder that folds the sheet P in half or in three, or the like.

Referring to FIG. 1, a description is provided of basic operations of the image forming apparatus 100 according to this embodiment.

When the image forming apparatus 100 receives an instruction to start a print job, a sheet P is fed from one of the plurality of sheet trays 16. For example, as the feed roller 17 rotates, the feed roller 17 and the separation pad 18 separate an uppermost sheet P from other sheets P (e.g., a sheaf of sheets P) placed in the sheet tray 16 and feed the uppermost sheet P.

When the sheet P is conveyed to a conveyance path 20 extended horizontally in FIG. 1 and disposed opposite the image forming device 3, the image forming device 3 forms an image on the sheet P. For example, as the liquid discharge heads 14 are controlled to discharge ink according to image data created by the scanner 2 that reads an image on an original or print data instructed by a terminal, the liquid discharge heads 14 discharge ink onto an image bearing face (e.g., an upper face) of the sheet P, thus forming an image on the sheet P. The image formed on the sheet P may be a meaningful image such as characters and drawings or a meaningless image such as patterns.

If the print job instructs duplex printing, the sheet P is conveyed in an opposite direction at a downstream position disposed downstream from the image forming device 3 in the sheet conveyance direction. Thus, the sheet P is guided to a reverse conveyance path 21. For example, after a trailing edge of the sheet P passes a first path switch 31 disposed downstream from the image forming device 3 in the sheet conveyance direction, the first path switch 31 switches a conveyance path to the reverse conveyance path 21 through which the sheet P is conveyed in the opposite direction. Thus, the first path switch 31 guides the sheet P to the reverse conveyance path 21. As the sheet P passes through the reverse conveyance path 21, the sheet P is conveyed to the image forming device 3 again in a state in which the sheet P is reversed. The image forming device 3 performs image formation as described above, forming an image on a back side of the sheet P.

A second path switch 32 is disposed downstream from the first path switch 31 in the sheet conveyance direction. The second path switch 32 selectively guides the sheet P bearing the image to a conveyance path 22 provided with a dryer 6 described below or a conveyance path 23 not provided with the dryer 6. If the second path switch 32 guides the sheet P to the conveyance path 22 provided with the dryer 6, the dryer 6 facilitates drying of ink on the sheet P. Conversely, if the second path switch 32 guides the sheet P to the conveyance path 23 not provided with the dryer 6, a third path switch 33 selectively guides the sheet P to a conveyance path 24 directed to the sheet ejection portion 7 or a conveyance path 25 directed to the post-processing apparatus 200. A fourth path switch 34 selectively guides the sheet P that is past the dryer 6 to a conveyance path 26 directed to the sheet ejection portion 7 or a conveyance path 27 directed to the post-processing apparatus 200.

If the sheet P is guided to the conveyance path 24 or 26 directed to the sheet ejection portion 7, the sheet P is ejected onto the sheet ejection portion 7. Conversely, if the sheet P is guided to the conveyance path 25 or 27 directed to the post-processing apparatus 200, the sheet P is conveyed to the post-processing apparatus 200 where the sheet P is treated with predetermined post-processing and ejected. Thus, a series of printing processes is completed. The image forming apparatus 100 according to this embodiment employs a face-down manner ejection system in which the sheet P is ejected onto the sheet ejection portion 7 or sent to the post-processing apparatus 200 in a state in which the image bearing face of the sheet P faces down. The image bearing face is adhered with ink when an image is formed on one side (e.g., a front side) of the sheet P. Alternatively, the image forming apparatus 100 may employ a face-up manner ejection system in which the sheet P is ejected onto the sheet ejection portion 7 or sent to the post-processing apparatus 200 in a state in which the image bearing face of the sheet P faces up.

The image forming apparatus 100 according to this embodiment includes a conveyance device including a plurality of conveyance roller pairs that conveys the sheet P supplied from the sheet supply 4.

Figure 2:
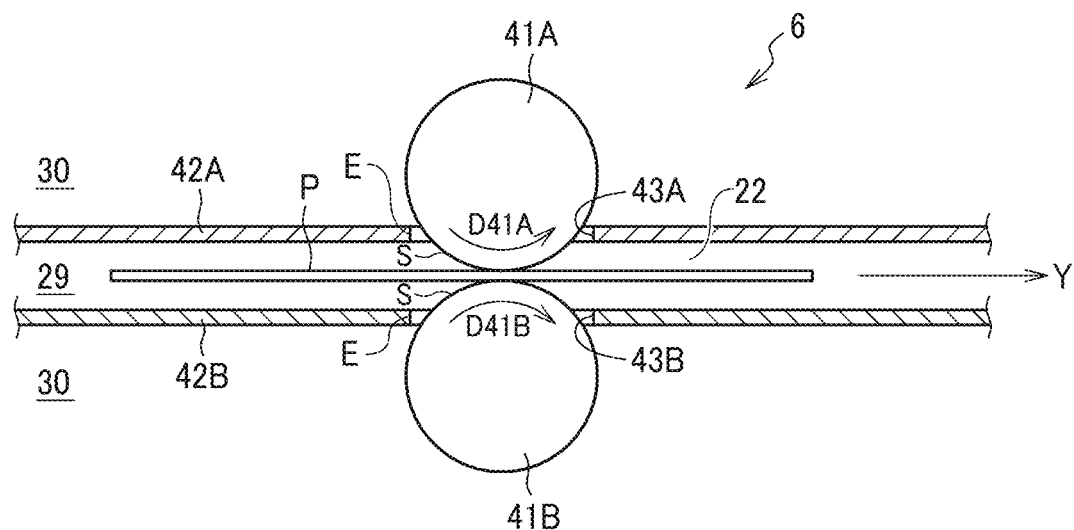
FIG. 2 is a side cross-sectional view of a conveyance device installed in the image forming apparatus depicted in FIG. 1, illustrating a conveyance roller pair incorporated in the conveyance device.

As illustrated in FIG. 2, the image forming apparatus 100 includes the dryer 6, serving as a conveyance device, that includes a conveyance roller pair constructed of two conveyance rollers 41A and 41B each of which serves as a conveyor that conveys the sheet P. The conveyance roller 41A contacts the conveyance roller 41B. As the sheet P enters a nip formed between the conveyance rollers 41A and 41B, the conveyance rollers 41A and 41B that rotate in rotation directions D41A and D41B, respectively, sandwich and convey the sheet P.

The dryer 6 serving as the conveyance device further includes a plurality of guides 42A and 42B that guides the sheet P in a sheet conveyance direction Y, The guide 42A is disposed opposite the guide 42B with a gap therebetween. Thus, the conveyance path 22 through which the sheet P is conveyed is formed between the guides 42A and 42B.

The guides 42A and 42B include through holes 43A and 43B where the conveyance rollers 41A and 41B are disposed, respectively. As the conveyance rollers 41A and 41B are placed in the through holes 43A and 43B, respectively, each of the conveyance rollers 41A and 41B spans a conveyance path exterior 30 and a conveyance path interior 29. Each of the guides 42A and 42B defines the conveyance path exterior 30 and the conveyance path interior 29. Hence, as the guides 42A and 42B guide the sheet P, the sheet P is conveyed while the sheet P contacts an outer face S (e.g., an outer circumferential surface) of each of the conveyance rollers 41A and 41B that project into the conveyance path interior 29. A clearance is provided between the outer face S of each of the conveyance rollers 41A and 41B and an edge E of each of the through holes 43A and 43B. The clearance prevents the conveyance rollers 41A and 41B from interfering with the through holes 43A and 43B, respectively.

Figure 3:
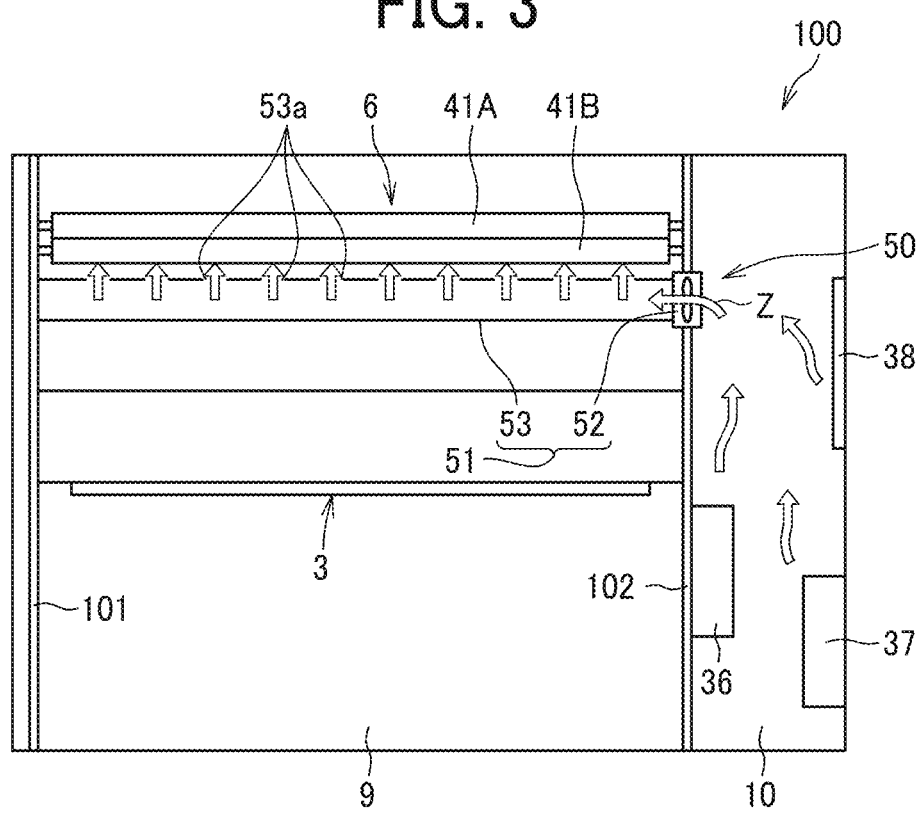

FIG. 3 is a diagram illustrating a construction of a warm air supply 50 that supplies warm air to the conveyance rollers 41A and 41B disposed in the dryer 6. FIG. 3 is a cross-sectional view of the image forming apparatus 100 taken on a cross section in a direction perpendicular to a surface of the paper on which FIG. 1 is drawn. A left side in FIG. 3 is a front face (e.g., a front) of the image forming apparatus 100. A right side in FIG. 3 is a rear face (e.g., a rear) of the image forming apparatus 100.

As illustrated in FIG. 3, the warm air supply 50 includes a ventilator 51 that sends warm air to the conveyance rollers 41A and 41B disposed in the dryer 6. For example, the ventilator 51 includes a fan 52 serving as an airflow generator and a duct 53 serving as an air channel former. The duct 53 extends in an axial direction of each of the conveyance rollers 41A and 41B. The duct 53 includes a conveyance roller side face that is disposed opposite the conveyance rollers 41A and 41B and is provided with a vent 53*a* through which warm air passing inside the duct 53 is expelled. The fan 52 is disposed at an upstream end of the duct 53 in an airflow direction Z. Alternatively, the fan 52 may be disposed in a partway of an airflow path inside the duct 53. Yet alternatively, the fan 52 may be disposed at a downstream portion of the duct 53 in the airflow direction Z at a position in proximity to the vent 53*a*.

As illustrated in FIG. 3, the image forming apparatus 10 according to this embodiment accommodates a front frame 101 and a rear frame 102 serving as supports that support the image forming device 3, the conveyance rollers 41A and 41B, and the like. The front frame 101 is disposed in proximity to a front outer wall (e.g., a front cover) of a body of the image forming apparatus 100. The rear frame 102 is spaced rearward from the front frame 101. Various elements constructing the image forming device 3 serving as a liquid discharge device, the conveyance rollers 41A and 41B, the duct 53, and the like are interposed between the front frame 101 and the rear frame 102. The front frame 101 and the rear frame 102 support both lateral ends of those elements in a longitudinal direction thereof, respectively.

A rear chamber 10 is defined between the rear frame 102 and a rear outer wall of the body of the image forming apparatus 100. The rear chamber 10 accommodates a driver 36, a power supply 37, and an electrical component 38. The driver 36 drives the image forming device 3, the conveyance rollers 41A and 41B, and the like. The power supply 37 supplies power to various elements inside the image forming apparatus 100. The electrical component 38 controls operations of various elements inside the image forming apparatus 1M. Alternatively, the driver 36, the power supply 37, and the electrical component 38 may be situated in a side chamber, an upper chamber, or a lower chamber inside the body of the image forming apparatus 100, instead of the rear chamber 10. A front chamber 9 is separated from the rear chamber 10 by the rear frame 102. The front chamber 9 accommodates the image forming device 3, the conveyance rollers 41A and 41B, the duct 53, and the like.

As described above, according to this embodiment, the rear chamber 10 accommodates the driver 36, the power supply 37, and the electrical component 38 serving as heat radiators that are subject to heat radiation by energization or driving. As the heat radiators radiate heat, the radiated heat warms air inside the rear chamber 10. The warm air supply 50 according to this embodiment supplies the air warmed in the rear chamber 10, that is, warm air, to the conveyance rollers 41A and 41B disposed in the dryer 6. For example, the fan 52 sends the warm air inside the rear chamber 10 into the duct 53. The warm air is sent to the conveyance rollers 41A and 41B through the vent 53a of the duct 53.

According to this embodiment, since the rear frame 102 separates the rear chamber from the front chamber 9, dry air (e.g., warm air) inside the rear chamber 10 is sent to the conveyance rollers 41A and 41B. For example, the rear chamber 10 contains less moisture that generates as ink on the sheet P evaporates than the front chamber 9. Hence, air containing less moisture (e.g., warm air) is supplied from the rear chamber 10 to the conveyance rollers 41A and 41B.

A description is provided of a construction of a comparative dryer.

The comparative dryer includes heating-conveyance rollers that heat and convey a sheet, facilitating drying of ink on the sheet.

However, the comparative dryer may include a heat source that heats the heating-conveyance roller. For example, if an exclusive heat source disposed inside the heating-conveyance roller heats the heating-conveyance roller, the heat source may increase power consumption. Additionally, heat is not conducted from an interior of the heating-conveyance roller to an outer face of the heating-conveyance roller efficiently. Accordingly, the comparative dryer may not dry the sheet effectively.

Referring to drawings illustrating embodiments of the present disclosure, the following describes a construction and operations of the dryer 6 in detail.

Figure 4:
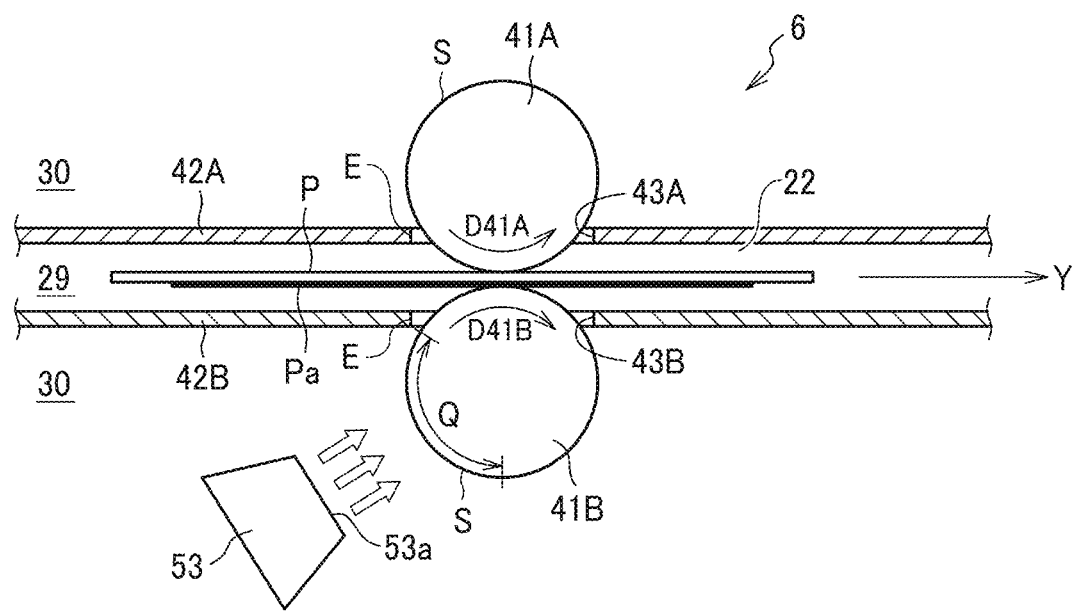
FIG. 4 is a side cross-sectional view of the conveyance device according to a first embodiment of the present disclosure, that is installed in the image forming apparatus depicted in FIG. 1.
Figure 5:
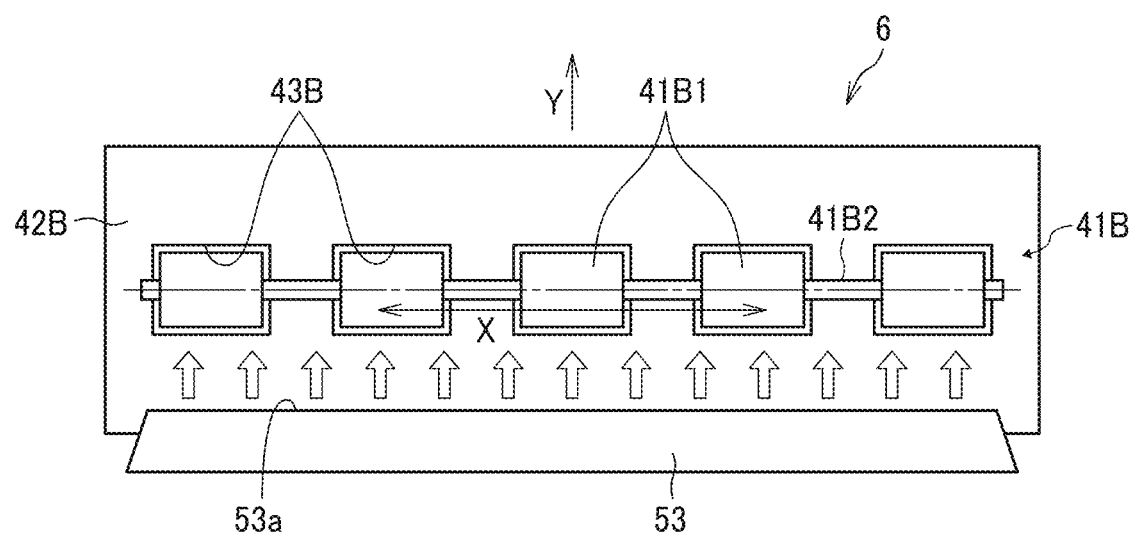
FIG. 5 is a plan view of the conveyance device depicted in FIG. 4.

FIGS. 4 and 5 illustrate a construction of the dryer 6 according to a first embodiment of the present disclosure. FIG. 4 is a side cross-sectional view of the dryer 6 seen in the axial direction of the conveyance rollers 41A and 41B. FIG. 5 is a plan view of the dryer 6 seen from a lower position in FIG. 4.

As illustrated in FIG. 4, according to this embodiment, the duct 53 sends warm air to the conveyance roller 41B serving as a lower conveyance roller disposed below the conveyance roller 41A. Hence, the duct 53 is disposed below the guide 42B serving as a lower guide disposed below the guide 42A. The duct 53 is disposed in the conveyance path exterior 30 disposed below the guide 42B, Accordingly, warm air sent from the duct 53 mainly blows against a conveyance path exterior side portion on the outer face S of the lower conveyance roller 41B, which is disposed in the conveyance path exterior 30. As illustrated in FIG. 5, the vent 53a of the duct 53 extends continuously in an axial direction X of the conveyance roller 41B so that the vent 53a sends air to the conveyance roller 41B including a plurality of roller portions 41B1 arranged in the axial direction X of the conveyance roller 41B. According to this embodiment, the conveyance roller 41B includes the plurality of roller portions 41B1 arranged in the axial direction X of a rotation shaft 41B2 of the conveyance roller 41B. Alternatively, instead of the plurality of roller portions 41B1, the conveyance roller 41B may include a single roller portion that extends continuously in the axial direction X of the rotation shaft 41B2 of the conveyance roller 41B.

According to this embodiment, when the sheet P enters the nip formed between the conveyance rollers 41A and 41B as a conveyance roller pair disposed inside the dryer 6, the conveyance rollers 41A and 41B that rotate in the rotation directions D41A and D41B, respectively, sandwich and convey the sheet P. A liquid adhesion face Pa (e.g., the image bearing face) of the sheet P that is conveyed comes into contact with the conveyance roller 41B disposed below the conveyance roller 41A. To address this circumstance, according to this embodiment, the duct 53 is disposed opposite the conveyance roller 41B so that the duct 53 sends warm air to the lower conveyance roller 41B. For example, as the warm air sent from the duct 53 warms the outer face S (e.g., the outer circumferential surface) of the lower conveyance roller 41B, when the sheet P comes into contact with the lower conveyance roller 41B, heat is conducted from the conveyance roller 41B to the liquid adhesion face Pa of the sheet P. Additionally, the outer face S of the lower conveyance roller 41B is made of a material that stores heat. Hence, the conveyance roller 41B stores heat of warm air blown against the conveyance roller 41B and supplies the heat to the liquid adhesion face Pa of the sheet P properly, thus facilitating drying of the liquid adhesion face Pa of the sheet P. Additionally, according to this embodiment, the duct 53 sends air containing less moisture (e.g., warm air) from the rear chamber 10 to the conveyance roller 41B, drying the liquid adhesion face Pa of the sheet P effectively.

More specifically, according to this embodiment, warm air sent from the duct 53 mainly warms the conveyance path exterior side portion of the conveyance roller 41B, that is disposed in the conveyance path exterior 30. As the conveyance roller 41B rotates, a heat storage portion of the conveyance roller 41B, that stores heat, reaches the conveyance path interior 29. Accordingly, the heat storage portion of the conveyance roller 41B comes into contact with the liquid adhesion face Pa of the sheet P, thus facilitating drying of the liquid adhesion face Pa of the sheet P. Warm air blown against the conveyance roller 41B is drier than air in the conveyance path interior 29, reducing moisture on the outer face S of the conveyance roller 41B and drying the sheet P effectively. In addition to the conveyance roller 41B, the outer face S of the conveyance roller 41A, serving as an upper conveyance roller disposed above the conveyance roller 41B, may also be made of a material that stores heat. Since heat is conducted from the lower conveyance roller 41B to the upper conveyance roller 41A also, if the outer face S of the upper conveyance roller 41A stores heat, the upper conveyance roller 41A and the lower conveyance roller 41B effectively warm both sides of the sheet P, that is, the back side and the front side of the sheet P, respectively, thus facilitating drying of the sheet P further.

According to this embodiment, the duct 53 sends warm air to the conveyance roller 41B in the conveyance path exterior 30 defined by the guide 42B, preventing an airflow (e.g., warm air) from entering the conveyance path interior 29. Accordingly, the airflow does not enter the conveyance path interior 29, suppressing fluttering of the sheet P and stabilizing conveyance of the sheet P. In order to prevent the airflow from fluttering the sheet P more effectively, the clearance between the edge E of the through hole 43B penetrating through the guide 42B and the outer face S of the conveyance roller 41B preferably decreases to a minimum.

The decreased clearance reduces the airflow that enters the conveyance path interior 29 through the through hole 43B (e.g., the clearance), suppressing fluttering of the sheet P caused by the airflow more effectively and improving conveyance of the sheet P.

According to this embodiment, as illustrated in FIG. 4, the duct 53 sends warm air to the conveyance roller 41B in a downstream portion within a region Q of the conveyance roller 41B in the rotation direction D41B thereof. The region Q is disposed in the conveyance path exterior 30, thus drying the sheet P more effectively. For example, the duct 53 sends warm air to the downstream portion of the conveyance roller 41B within the region Q on the outer face S of the conveyance roller 41B. The downstream portion of the conveyance roller 41B in the sheet conveyance direction Y is disposed in the conveyance path exterior 30 and disposed immediately upstream from the conveyance path interior 29 in the rotation direction D41B of the conveyance roller 41B. Accordingly, before the temperature of the heat storage portion of the conveyance roller 41B decreases substantially, the heat storage portion of the conveyance roller 41B comes into contact with the sheet P. Consequently, the heat storage portion of the conveyance roller 41B supplies heat to the sheet P efficiently, improving drying of the sheet P.

As illustrated in FIG. 4, the downstream portion of the conveyance roller 41B in the rotation direction D41B thereof or the sheet conveyance direction Y in the conveyance path exterior 30 defines the region Q, that is, a downstream half of the outer face S of the lower conveyance roller 41B in the rotation direction D41B thereof, if a part of the outer face S of the lower conveyance roller 41B, that is situated in the conveyance path exterior 30, is divided into an upstream half and the downstream half in the rotation direction D41B of the conveyance roller 41B. However, warm air may blow against an entirety or a part of the downstream portion (e.g., the region Q) of the conveyance roller 41B in the rotation direction D41B thereof in the conveyance path exterior 30.

As described above, according to this embodiment, the duct 53 sends warm air to the conveyance roller 41B that comes into contact with the liquid adhesion face Pa of the sheet P. The conveyance roller 41B that is warmed heats the liquid adhesion face Pa of the sheet P, thus facilitating drying of the liquid adhesion face Pa of the sheet P. Additionally, according to this embodiment, heat (e.g., warm air) generated inside the image forming apparatus 100 by the heat radiators such as the driver 36, the power supply 37, and the electrical component 38 situated in the rear chamber 10 is used effectively as a heat source that warms the conveyance roller 41B, thus drying the sheet P with a decreased power consumption.

According to this embodiment, the conveyance roller 41B is not warmed by a heat source or the like disposed inside the conveyance roller 41B. The conveyance roller 41B is warmed by warm air that blows against the outer face S of the conveyance roller 41B. Thus, the warm air warms a part of the conveyance roller 41B (e.g., the outer face S of the conveyance roller 41B), which comes into contact with the sheet P, effectively. Accordingly, the dryer 6 reduces an amount of heat used to dry the sheet P, thus drying the sheet P effectively while suppressing increase in power consumption. As illustrated in FIG. 4, the warm air blows against the lower conveyance roller 41B disposed below the conveyance path 22. Alternatively, the warm air may blow against the upper conveyance roller 41A. Yet alternatively, the warm air may blow against one of conveyance rollers constructing a conveyance roller pair that conveys the sheet P vertically. Those alternatives are also applied to embodiments described below.

As described above, according to this embodiment, warm air sent from the duct 53 warms the outer face S of the conveyance roller 41B efficiently. Additionally, heat (e.g., warm air) generated inside the image forming apparatus 100 is used effectively to warm the conveyance roller 41B. Accordingly, the dryer 6 dries the sheet P effectively while suppressing increase in power consumption that might generate if a heat source for drying the sheet P is installed in the image forming apparatus 100. For example, according to this embodiment, as heat (e.g., warm air) that warms the outer face S of the conveyance roller 41B, instead of heat generated by a heat generator such as a heater, heat generated by the heat radiators such as the driver 36, the power supply 37, and the electrical component 38 that radiate heat regardless of primary objectives and functions thereof is used to warm the conveyance roller 41B, thus reducing power consumption for supplying heat. Particularly, like this embodiment, if an exclusive heat source for drying the sheet P is not installed in the image forming apparatus 100, the dryer 6 reduces manufacturing costs of the image forming apparatus 100 and simplifies the construction of the image forming apparatus 100, improving reliability of the image forming apparatus 100.

A description is provided of embodiments that are different from the first embodiment described above.

Hereinafter, the embodiments are described mainly of configurations that are different from those of the first embodiment described above. A description of other configurations that are basically common to the first embodiment described above is omitted properly.

Figure 6:
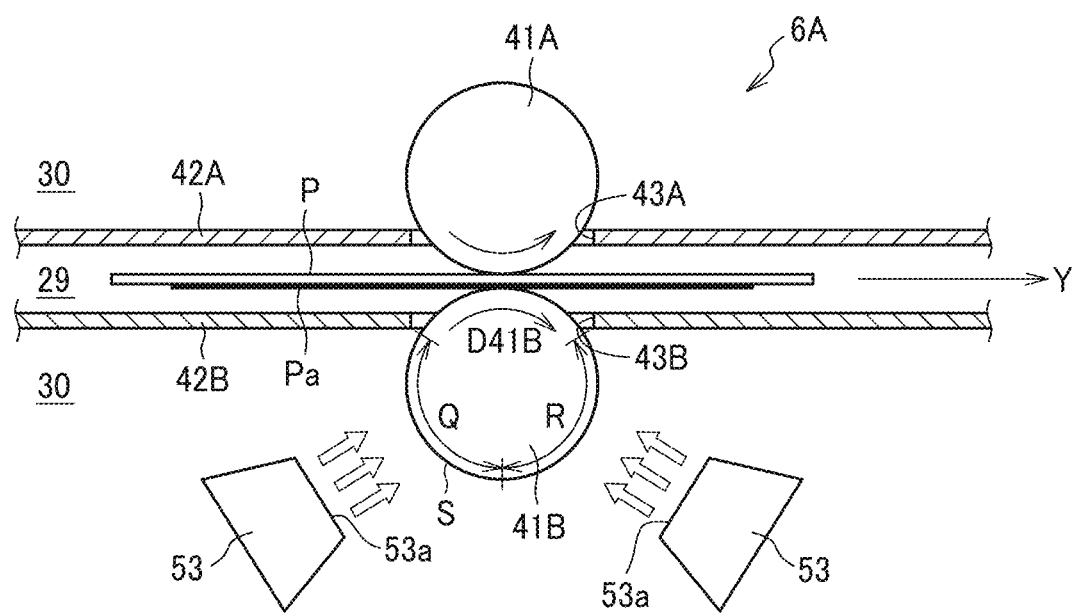
FIG. 6 is a side cross-sectional view of a conveyance device according to a second embodiment of the present disclosure, that is installable in the image forming apparatus depicted in FIG. 1.
Figure 7:
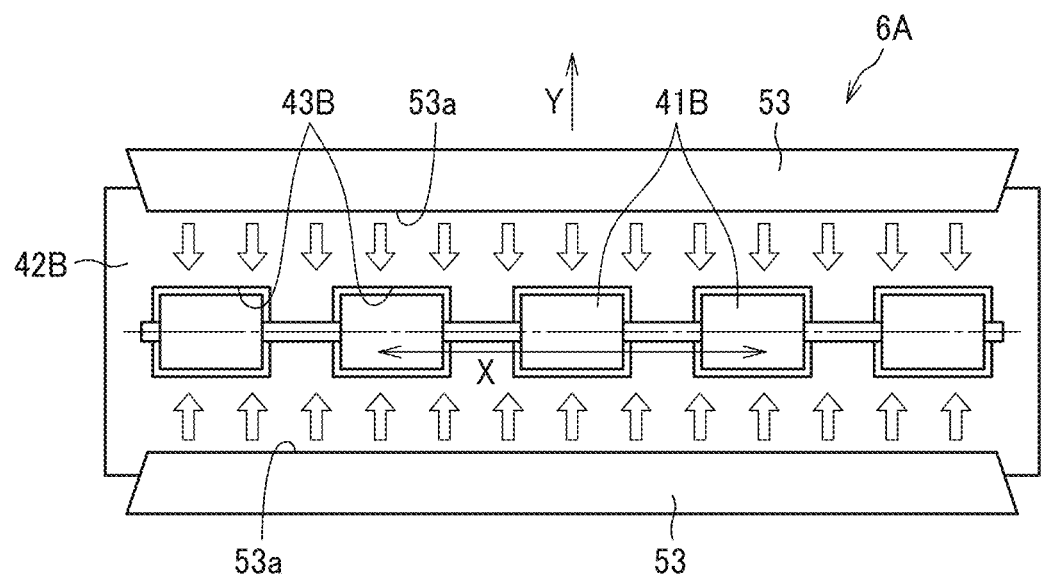
FIG. 7 is a plan view of the conveyance device depicted in FIG. 6.

FIG. 6 is a side cross-sectional view of a dryer 6A according to a second embodiment of the present disclosure, illustrating a construction of the dryer 6A. FIG. 7 is a plan view of the dryer 6A.

As illustrated in FIG. 6, the dryer 6A according to the second embodiment of the present disclosure includes, in addition to the duct 53 that is disposed in the conveyance path exterior 30 and disposed opposite the downstream portion of the conveyance roller 41B in the rotation direction D41B thereof, that is disposed within the region Q, another duct 53 disposed opposite an upstream portion of the conveyance roller 41B in the rotation direction D41B thereof or the sheet conveyance direction Y, that is disposed within a region R. The duct 53 sends warm air to the conveyance roller 41B through the vent 53a. As illustrated in FIG. 6, the upstream portion of the conveyance roller 41B in the rotation direction D41B thereof in the conveyance path exterior 30 defines the region R, that is, the upstream half of the outer face S of the lower conveyance roller 41B in the rotation direction D41B thereof or the sheet conveyance direction Y in the conveyance path exterior 30. The downstream portion of the conveyance roller 41B in the rotation direction D41B thereof in the conveyance path exterior 30 is defined above.

According to this embodiment, the two ducts 53 branch off from a position downstream from the fan 52 in the airflow direction Z depicted in FIG. 3. The ducts 53 guide warm air to the upstream portion and the downstream portion of the conveyance roller 41B in the rotation direction D41B thereof, respectively. Alternatively, instead of the two ducts 53 produced by branching, the dryer 6A may include two ducts defining separate air channels provided with separate fans, respectively.

As described above, according to the second embodiment of the present disclosure, the ducts 53 blow warm air against both the upstream portion and the downstream portion of the conveyance roller 41B in the rotation direction D41B thereof, respectively, thus warming the conveyance roller 41B more effectively and improving drying of the sheet P. Particularly, immediately after the sheet P comes into contact with the conveyance roller 41B, as the sheet P draws heat from the outer face S of the conveyance roller 41B, the temperature of the outer face S of the conveyance roller 41B tends to decrease. To address this circumstance, according to this embodiment, the duct 53 blows warm air against the upstream portion of the conveyance roller 41B in the rotation direction D41B thereof, increasing the temperature of the outer face S of the upstream portion of the conveyance roller 41B, which is subject to temperature decrease, and improving heat storage of the conveyance roller 41B. Warm air may blow against an entirety or a part of the upstream portion (e.g., the region R) of the conveyance roller 41B in the rotation direction D41B thereof.

Figure 8:
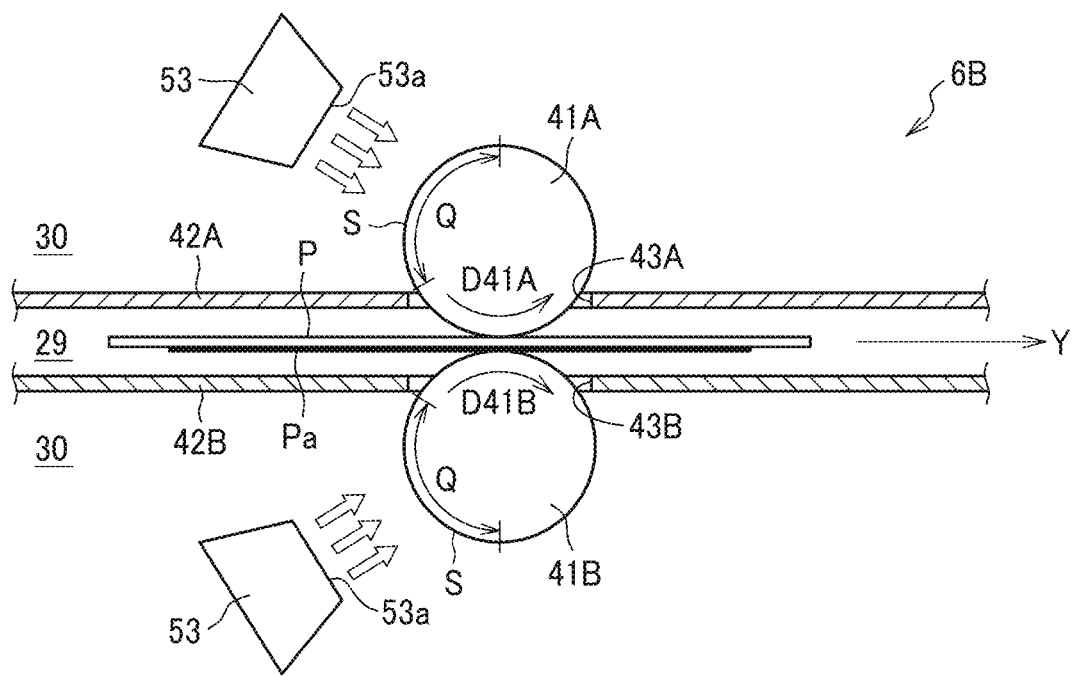
FIG. 8 is a side cross-sectional view of a conveyance device according to a third embodiment of the present disclosure, that is installable in the image forming apparatus depicted in FIG. 1.

FIG. 8 is a side cross-sectional view of a dryer 6B according to a third embodiment of the present disclosure, illustrating a construction of the dryer 6B.

As illustrated in FIG. 8, the dryer 6B according to the third embodiment of the present disclosure includes, in addition to the duct 53 disposed opposite the lower conveyance roller 41B, another duct 53 that is disposed opposite the upper conveyance roller 41A and includes the vent 53a through which the duct 53 sends warm air to the conveyance roller 41A. The warm air warms the outer face S (e.g., the outer circumferential surface) of each of the upper conveyance roller 41A and the lower conveyance roller 41B, facilitating drying of both the front side and the back side of the sheet P simultaneously and drying the sheet P more effectively. According to this embodiment, the ducts 53 send warm air to the downstream portions within the regions Q of the conveyance rollers 41A and 41B in the rotation directions D41A and D41B thereof in the conveyance path exteriors 30, respectively, thus drying the sheet P effectively. The ducts 53 communicate with the single fan 52 from which warm air is divided and guided to the two ducts 53, respectively. Alternatively, the ducts 53 may communicate with separate fans from which warm air is guided to the ducts 53, respectively.

Figure 9:
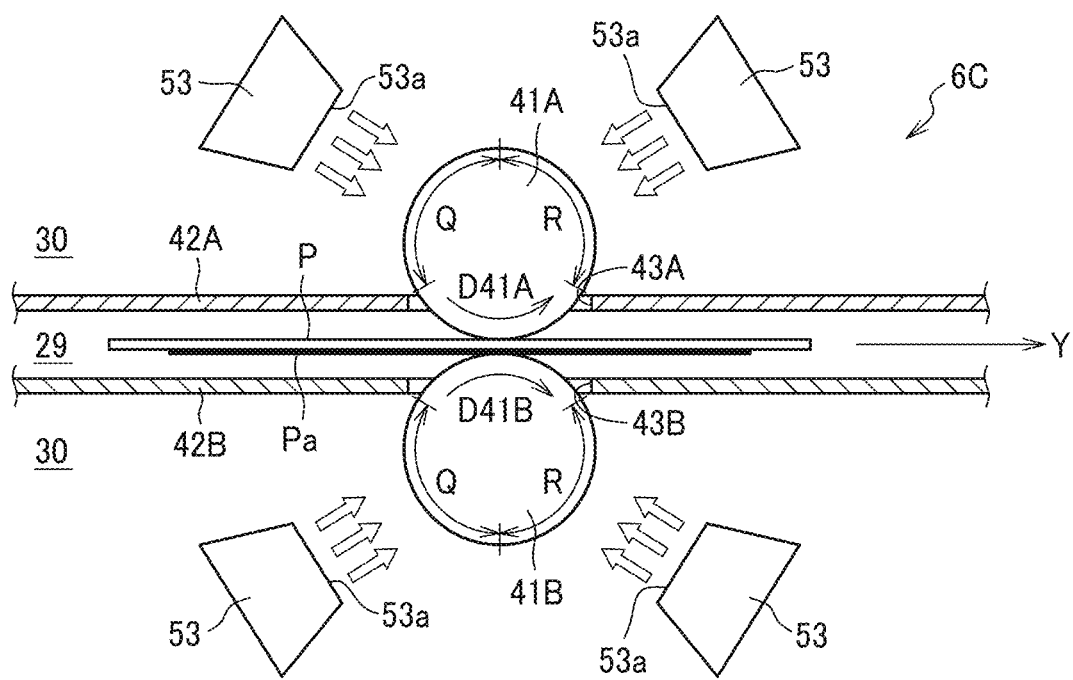
FIG. 9 is a side cross-sectional view of a conveyance device according to a fourth embodiment of the present disclosure, that is installable in the image forming apparatus depicted in FIG. 1.

FIG. 9 is a side cross-sectional view of a dryer 6C according to a fourth embodiment of the present disclosure, illustrating a construction of the dryer 6C.

As illustrated in FIG. 9, the dryer 6C according to the fourth embodiment of the present disclosure includes the ducts 53 that send warm air to both the upper conveyance roller 41A and the lower conveyance roller 41B, respectively. The ducts 53 send warm air to an upstream portion within the region R and a downstream portion within the region Q of the conveyance roller 41A in the rotation direction D41A thereof and the upstream portion within the region R and the downstream portion within the region Q of the conveyance roller 41B in the rotation direction D41B thereof in the conveyance path exteriors 30, respectively. The dryer 6C dries both the front side and the back side of the sheet P simultaneously. Additionally, the dryer 6C enhances heat storage of the conveyance rollers 41A and 41B, drying the sheet P more effectively.

Figure 10:
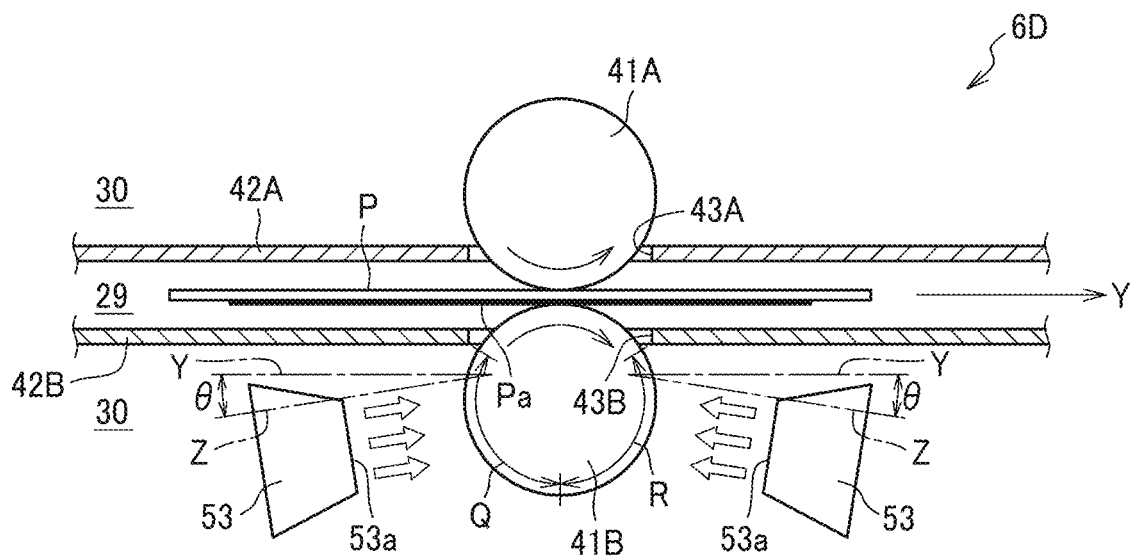
FIG. 10 is a side cross-sectional view of a conveyance device according to a fifth embodiment of the present disclosure, that is installable in the image forming apparatus depicted in FIG. 1.

FIG. 10 is a side cross-sectional view of a dryer 6D according to a fifth embodiment of the present disclosure, illustrating a construction of the dryer 6D.

As described above, in the dryer 6B according to the third embodiment depicted in FIG. 8 and the dryer 6C according to the fourth embodiment depicted in FIG. 9, the ducts 53 send warm air to both the upper conveyance roller 41A and the lower conveyance roller 41B, respectively, facilitating drying of the sheet P. However, in the dryers 6B and 6C, a part of an airflow blown against the upper conveyance roller 41A may enter the conveyance path interior 29 through the through hole 43A penetrating through the guide 42A. If the airflow entering the conveyance path interior 29 presses against an opposite face of the sheet P opposite the liquid adhesion face Pa with increased pressure, the liquid adhesion face Pa of the sheet P may come into contact with the lower guide 42B.

To address this circumstance, the dryer 6D according to the fifth embodiment depicted in FIG. 10 includes the ducts 53 that are disposed opposite the lower conveyance roller 41B and send warm air to the conveyance roller 41B. Thus, the dryer 6D prevents the airflow from entering the conveyance path interior 29 through the through hole 43A penetrating through the upper guide 42A. Accordingly, the dryer 6D prevents the airflow from moving downward into the conveyance path interior 29 and pressing against the sheet P, thus reducing the possibility of contact of the liquid adhesion face Pa of the sheet P with the lower guide 42B. Additionally, according to this embodiment, in order to suppress entering of the airflow into the conveyance path interior 29, the airflow direction Z of warm air sent from each of the ducts 53 to the conveyance roller 41B and the sheet conveyance direction Y define an angle θ that is an acute angle. For example, the angle θ is greater than zero degree and smaller than 90 degrees (0°<θ<90°). As described above, according to this embodiment, the angle θ defined by the airflow direction Z and the sheet conveyance direction Y is the acute angle. Hence, even if the sheet P is thin paper or the like that is subject to fluttering, the dryer 6D suppresses fluttering of the sheet P and ensures drying performance for drying the sheet P.

Figure 11:
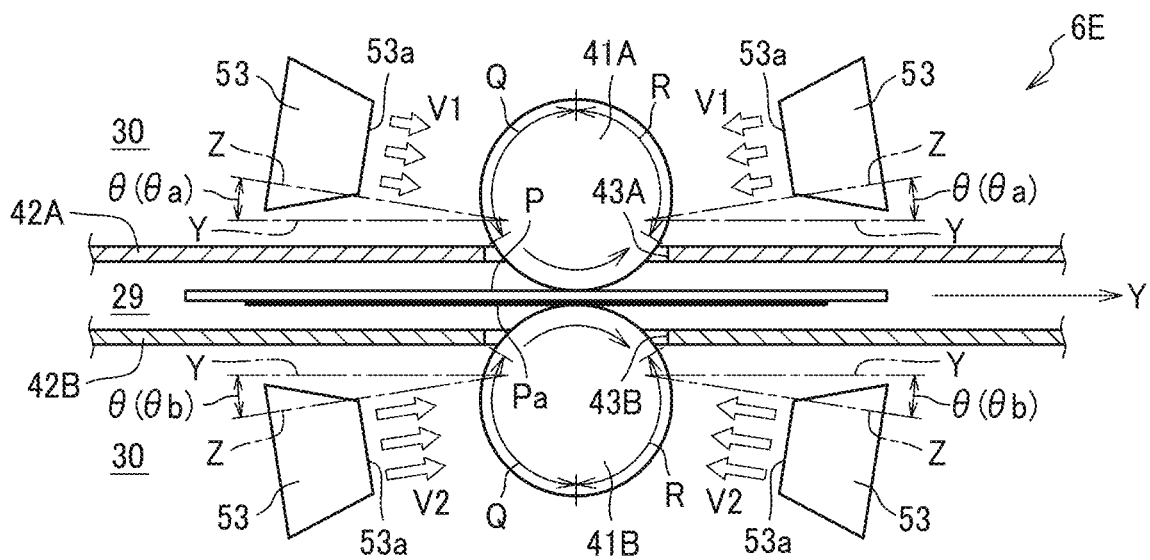
FIG. 11 is a side cross-sectional view of a conveyance device according to a sixth embodiment of the present disclosure, that is installable in the image forming apparatus depicted in FIG. 1.

FIG. 11 is a side cross-sectional view of a dryer 6E according to a sixth embodiment of the present disclosure, illustrating a construction of the dryer 6E.

The dryer 6E according to the sixth embodiment depicted in FIG. 11 includes, in addition to the ducts 53 that are disposed opposite the conveyance roller 41B, like the ducts 53 of the dryer 6D according to the fifth embodiment described above with reference to FIG. 10, another ducts 53 that are disposed opposite the upper conveyance roller 41A and send warm air to the conveyance roller 41A. Additionally, according to this embodiment, in order to prevent the airflow that moves downward into the conveyance path interior 29 from fluttering the sheet P, a wind velocity V1 (e.g., a wind strength) of an airflow sent from each of the upper ducts 53 is smaller or weaker than a wind velocity V2 (e.g., a wind strength) of an airflow sent from each of the lower ducts 53 (V1<V2). Accordingly, the dryer 6E prevents the airflow moving downward into the conveyance path interior 29 from pressing against the sheet P, thus preventing the liquid adhesion face Pa of the sheet P from coming into contact with the lower guide 42B.

In the dryer 6E according to the sixth embodiment, like in the dryer 6D according to the fifth embodiment depicted in FIG. 10, the airflow direction Z of warm air sent from each of the ducts 53 and the sheet conveyance direction Y define the angle θ that is the acute angle. For example, the angle θ is greater than zero degree and smaller than 90 degrees (0°<θ<90°). Accordingly, the airflow does not enter the conveyance path interior 29, suppressing fluttering of the sheet P further and conveying the sheet P properly while preventing degradation of an image on the sheet P.

In the dryer 6E according to the sixth embodiment, an angle θa defined by the airflow direction Z of warm air sent from each of the upper ducts 53 and the sheet conveyance direction Y may be smaller than an angle θb defined by the airflow direction Z of warm air sent from each of the lower ducts 53 and the sheet conveyance direction Y (θa<θb). Accordingly, the dryer 6E suppresses entry of the airflow into the conveyance path interior 29 from the upper ducts 53 further, thus suppressing fluttering of the sheet P caused by the airflow moving downward and entering the conveyance path interior 29 through the through hole 43A more effectively.

Figure 12:
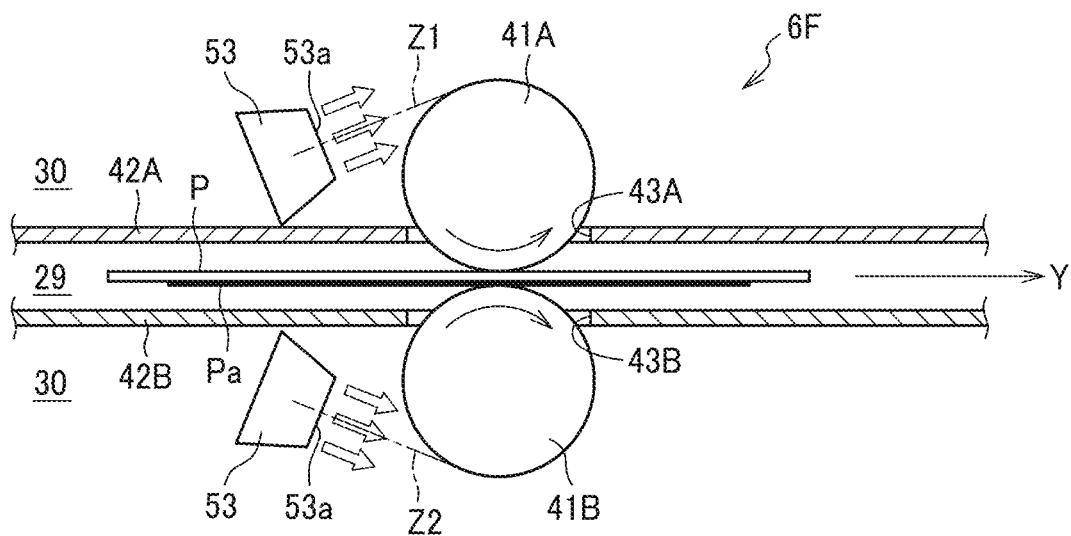
FIG. 12 is a side cross-sectional view of a conveyance device according to a seventh embodiment of the present disclosure, that is installable in the image forming apparatus depicted in FIG. 1.

FIG. 12 is a side cross-sectional view of a dryer 6F according to a seventh embodiment of the present disclosure, illustrating a construction of the dryer 6F.

As illustrated in FIG. 12, the dryer 6F according to the seventh embodiment of the present disclosure includes the ducts 53 that are disposed opposite the conveyance rollers 41A and 41B, respectively, and send warm air to the conveyance rollers 41A and 41B in airflow directions Z1 and Z2 that separate from the guides 42A and 42B, respectively. Accordingly, the dryer 6F prevents an airflow from entering the conveyance path interior 29 through the through holes 43A and 43B penetrating through the guides 42A and 42B, respectively, more effectively. Consequently, the dryer 6F suppresses fluttering of the sheet P caused by the airflow more effectively, improving conveyance of the sheet P.

Figure 13:
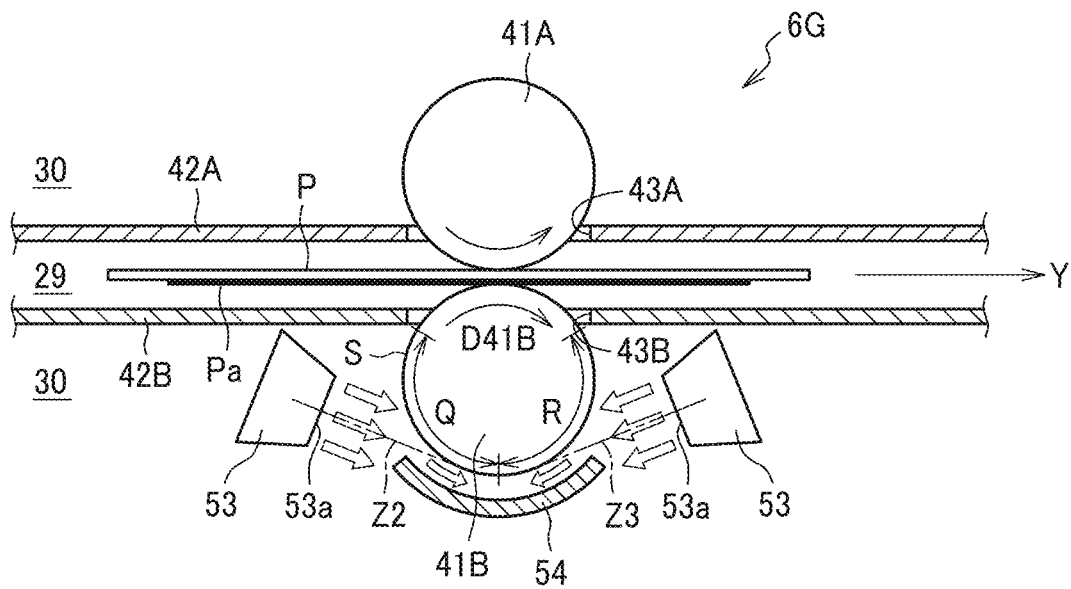
FIG. 13 is a side cross-sectional view of a conveyance device according to an eighth embodiment of the present disclosure, that is installable in the image forming apparatus depicted in FIG. 1.

FIG. 13 is a side cross-sectional view of a dryer 6G according to an eighth embodiment of the present disclosure, illustrating a construction of the dryer 6G.

As illustrated in FIG. 13, the dryer 6G according to the eighth embodiment of the present disclosure includes, like the dryer 6F according to the seventh embodiment depicted in FIG. 12, the ducts 53 that are disposed opposite the conveyance roller 41B and send warm air to the conveyance roller 41B in airflow directions Z2 and Z3 that separate from the guide 42B. The dryer 6G according to the eighth embodiment further includes a cover 54 disposed opposite the outer face S of the conveyance roller 41B in the lower, conveyance path exterior 30. The cover 54 is disposed opposite the outer face S of the conveyance roller 41B with a gap therebetween. Hence, as the ducts 53 send warm air, the warm air enters the gap between the cover 54 and the conveyance roller 41B. The cover 54 stores the warm air in a periphery of the conveyance roller 41B.

As described above, according to this embodiment, the cover 54 stores the warm air in the periphery of the conveyance roller 41B. The stored warm air suppresses heat dissipation from the outer face S of the conveyance roller 41B, retaining the conveyance roller 41B to store heat. Particularly, if the cover 54 spans from the upstream portion (e.g., the region R) to the downstream portion (e.g., the region Q) of the conveyance roller 41B in the rotation direction D41B thereof, like this embodiment, the cover 54 suppresses heat dissipation from the conveyance roller 41B effectively in an increased span on the conveyance roller 41B in the rotation direction D41B thereof. As illustrated in FIG. 13, the cover 54 is an arc curved along the outer face S of the conveyance roller 41B. Alternatively, the cover 54 may be curved into a shape other than the arc or may define a polyline having a straight line in cross section. The cover 54 may be disposed opposite the upper conveyance roller 41A. In this case, as warm air blows against the upper conveyance roller 41A, the cover 54 allows the conveyance roller 41A to store heat like the cover 54 disposed opposite the lower conveyance roller 41B.

Figure 14:
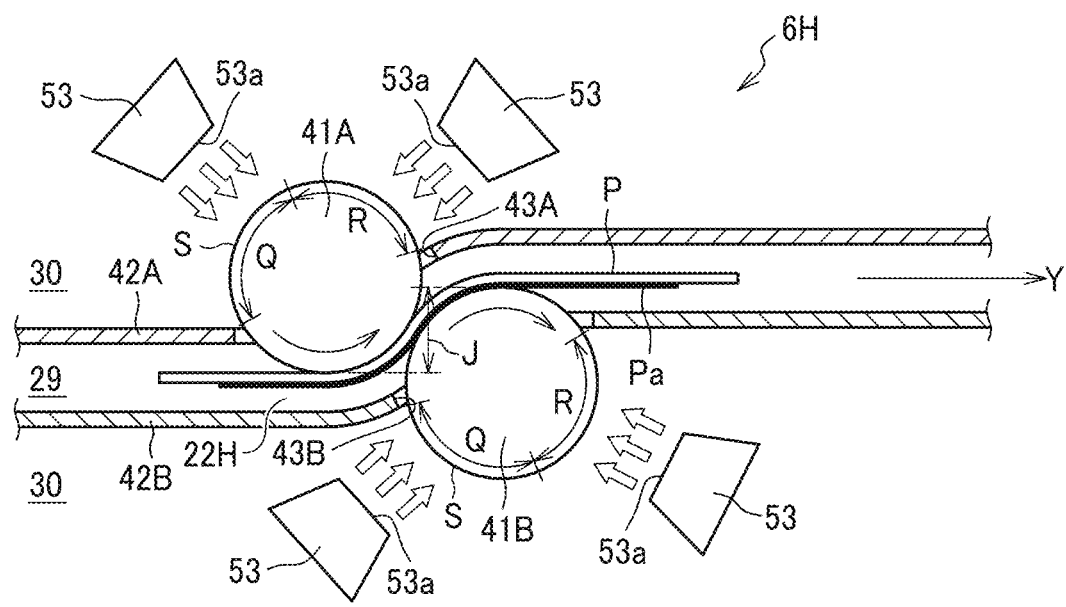
FIG. 14 is a side cross-sectional view of a conveyance device according to a ninth embodiment of the present disclosure, that is installable in the image forming apparatus depicted in FIG. 1.

FIG. 14 is a side cross-sectional view of a dryer 6H according to a ninth embodiment of the present disclosure, illustrating a construction of the dryer 6H.

As illustrated in FIG. 14, the dryer 6H according to the ninth embodiment of the present disclosure includes the upper conveyance roller 41A and the lower conveyance roller 41B that is shifted with respect to the upper conveyance roller 41A in the sheet conveyance direction Y. The upper conveyance roller 41A overlaps the lower conveyance roller 41B in a span J seen in an entry direction of the sheet P with respect to the upper conveyance roller 41A (e.g., a horizontal direction in FIG. 14). Hence, the dryer 6H according to the ninth embodiment includes a conveyance path 22H curved and defined by the upper conveyance roller 41A serving as an upstream conveyance roller and the lower conveyance roller 41B serving as a downstream conveyance roller in the sheet conveyance direction Y. The sheet P is conveyed from the conveyance roller 41A to the conveyance roller 41B through the conveyance path 22H in a state in which the sheet P is bent.

As described above, the dryer 6H according to the ninth embodiment includes the conveyance path 22H through which the sheet P is conveyed from the upstream conveyance roller 41A to the downstream conveyance roller 41B in the sheet conveyance direction Y in a state in which the sheet P is bent. Accordingly, the sheet P is conveyed through the conveyance path 22H such that the sheet P is partially wound around the outer face S of each of the conveyance rollers 41A and 41B. Hence, the sheet P contacts the upper conveyance roller 41A and the lower conveyance roller 41B for an increased length, increasing an amount of heat conducted to the sheet P from the conveyance rollers 41A and 41B and facilitating drying of the sheet P more effectively. According to this embodiment, the upper conveyance roller 41A is disposed upstream from the lower conveyance roller 41B in the sheet conveyance direction Y. Conversely, the lower conveyance roller 41B may be disposed upstream from the upper conveyance roller 41A in the sheet conveyance direction Y.

Figure 15:
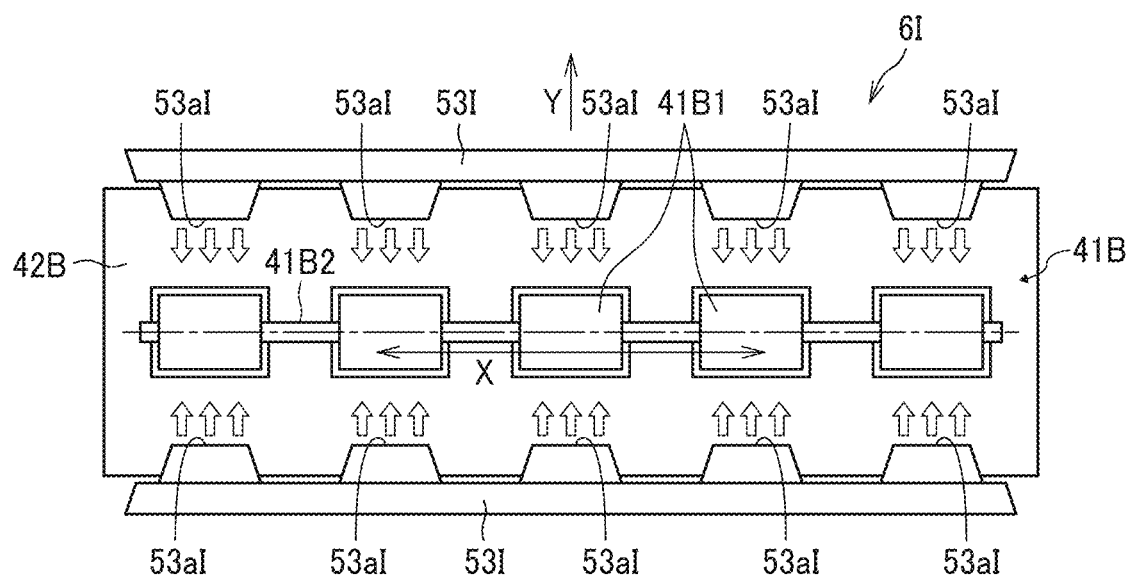
FIG. 15 is a plan view of a conveyance device according to a tenth embodiment of the present disclosure, that is installable in the image forming apparatus depicted in FIG. 1.

FIG. 15 is a plan view of a dryer 6I according to a tenth embodiment of the present disclosure, illustrating a construction of the dryer 6I.

As illustrated in FIG. 15, the dryer 6I according to the tenth embodiment of the present disclosure includes ducts 531 each of which includes a plurality of vents 53a1 that corresponds to the plurality of roller portions 41B1 of the conveyance roller 41B. For example, the vents 53aI are disposed opposite the roller portions 41B1 of the conveyance roller 41B, respectively, and arranged substantially throughout an entire span of the conveyance roller 41B in the axial direction X thereof or the width direction of the sheet P, which is perpendicular to the sheet conveyance direction Y.

As described above, each of the vents 53aI is disposed opposite the roller portion 41B1 of the conveyance roller 41B and is not disposed opposite the rotation shaft 41B2 of the conveyance roller 41B. Accordingly, the vents 53aI effectively send warm air to the roller portions 41B1 of the conveyance roller 41B, respectively, and increase an amount of warm air for each of the roller portions 41B1. Consequently, the dryer 6I according to the tenth embodiment warms each of the roller portions 41B1 effectively, improving drying performance for drying the sheet P. Alternatively, the fan 52 may be provided for each of the vents 53aI through which warm air is sent to each of the roller portions 41B1 more effectively.

Figure 16:
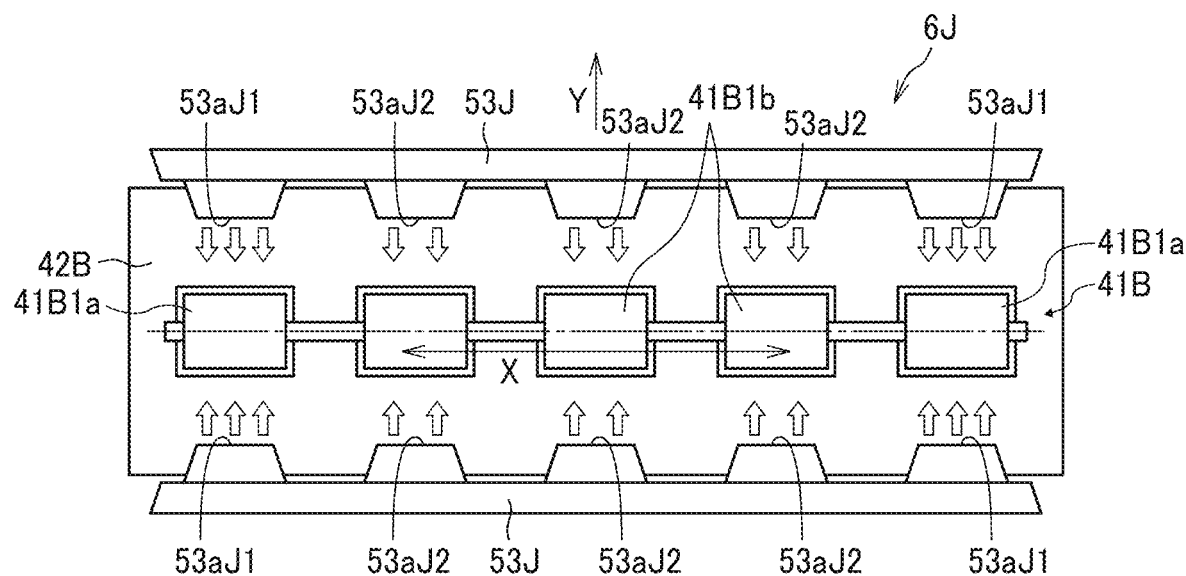
FIG. 16 is a plan view of a conveyance device according to an eleventh embodiment of the present disclosure, that is installable in the image forming apparatus depicted in FIG. 1.

FIG. 16 is a plan view of a dryer 6J according to an eleventh embodiment of the present disclosure, illustrating a construction of the dryer 6J.

As illustrated in FIG. 16, the dryer 6J according to the eleventh embodiment of the present disclosure includes ducts 53J that are disposed opposite the conveyance roller 41B and include outboard vents 53aJ1 disposed at both lateral ends of each of the ducts 53J and inboard vents 53aJ2 disposed inboard from the outboard vents 53aJ1 in the axial direction X of the conveyance roller 41B (e.g., the width direction of the sheet P). An amount of warm air discharged from the outboard vent 53aJ1 is different from an amount of warm air discharged from the inboard vent 53aJ2. The amount of warm air discharged from the outboard vent 53aJ1 and the inboard vent 53aJ2 is adjusted by differentiating an outlet area of the outboard vent 53aJ1 from an outlet area of the inboard vent 53aJ2. For example, the amount of warm air discharged from the outboard vent 53aJ1 is greater than the amount of warm air discharged from the inboard vent 53aJ2. The outboard vents 53aJ1 supply an increased amount of heat to outboard roller portions 41B1a disposed at both lateral ends of the conveyance roller 41B in the axial direction X thereof because the outboard roller portions 41B1a are subject to heat dissipation. Thus, the outboard vents 53aJ1 decrease a temperature difference between the outboard roller portions 41B1a and inboard roller portions 41B1b disposed inboard from the outboard roller portions 41B1a in the axial direction X of the conveyance roller 41B. Hence, the dryer 63 according to the eleventh embodiment decreases uneven drying of the sheet P in the width direction thereof. According to this embodiment, the amount of warm air discharged from the outboard vent 53aJ1 and the inboard vent 53aJ2 is adjusted by differentiating the outlet area of the outboard vent 53aJ1 from the outlet area of the inboard vent 53aJ2. Alternatively, the amount of warm air may be adjusted by varying a distribution ratio of an airflow guided to the outboard vent 53aJ1 and the inboard vent 53aJ2. Yet alternatively, the amount of warm air may be adjusted by varying a wind velocity (e.g., a rotation speed) of the fan 52 provided for each of the outboard vent 53aJ1 and the inboard vent 53aJ2.

Figure 17:
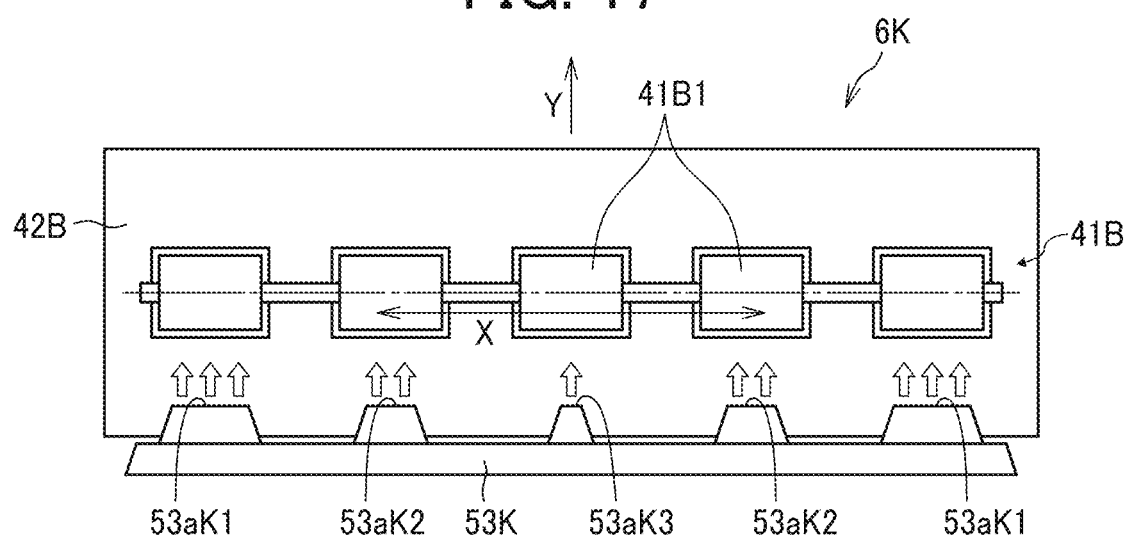
FIG. 17 is a plan view of a conveyance device according to a twelfth embodiment of the present disclosure, that is installable in the image forming apparatus depicted in FIG. 1.

FIG. 17 is a plan view of a dryer 6K according to a twelfth embodiment of the present disclosure, illustrating a construction of the dryer 6K.

As illustrated in FIG. 17, the dryer 6K according to the twelfth embodiment of the present disclosure includes a duct 53K that is disposed opposite the conveyance roller 41B and includes outboard vents 53aK1 disposed at both lateral ends of the duct 53K, a center vent 53aK3 disposed at a center of the duct 53K, and intermediate vents 53aK2 interposed between the outboard vent 53aK1 and the center vent 53aK3 in the axial direction X of the conveyance roller 41B (e.g., the width direction of the sheet P). An amount of warm air discharged from the outboard vent 53aK1 is greater than an amount of warm air discharged from the intermediate vent 53aK2. The amount of warm air discharged from the intermediate vent 53aK2 is greater than an amount of warm air discharged from the center vent 53aK3. As described above, the amount of warm air that is discharged varies between the outboard vent 53aK1, the intermediate vent 53aK2, and the center vent 53aK3. Accordingly, the duct 53K adjusts the amount of warm air (e.g., air capacity) sent to the roller portions 41B1 of the conveyance roller 41B precisely, decreasing uneven drying of the sheet P in the width direction thereof more effectively. According to this embodiment, the amount of warm air discharged from the outboard vent 53aK1, the intermediate vent 53aK2, and the center vent 53aK3 is adjusted by varying an outlet area of the outboard vent 53aK1, the intermediate vent 53aK2, and the center vent 53aK3. Alternatively, the amount of warm air may be adjusted by varying a distribution ratio of an airflow guided to the outboard vent 53aK1, the intermediate vent 53aK2, and the center vent 53aK3. Yet alternatively, the amount of warm air may be adjusted by varying an output (e.g., a rotation speed) of the fan 52 provided for each of the outboard vent 53aK1, the intermediate vent 53aK2, and the center vent 53aK3.

Figure 18:
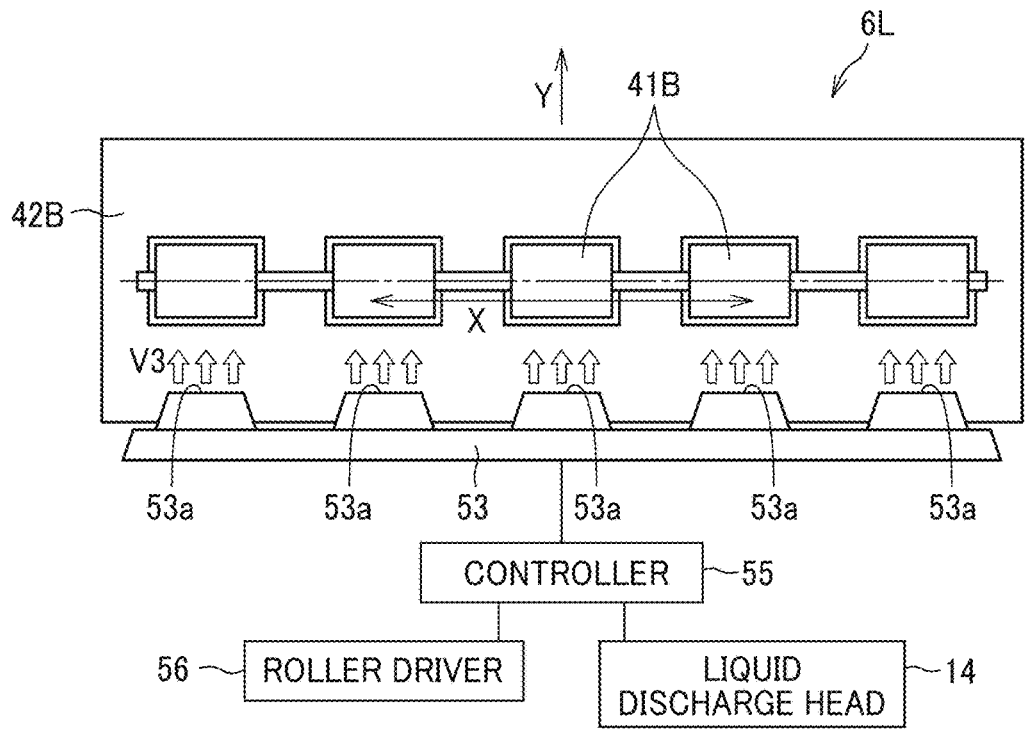
FIG. 18 is a plan view of a conveyance device according to a thirteenth embodiment of the present disclosure, that is installable in the image forming apparatus depicted in FIG. 1, illustrating a decreased amount of warm air discharged from a duct of the conveyance device.
Figure 19:
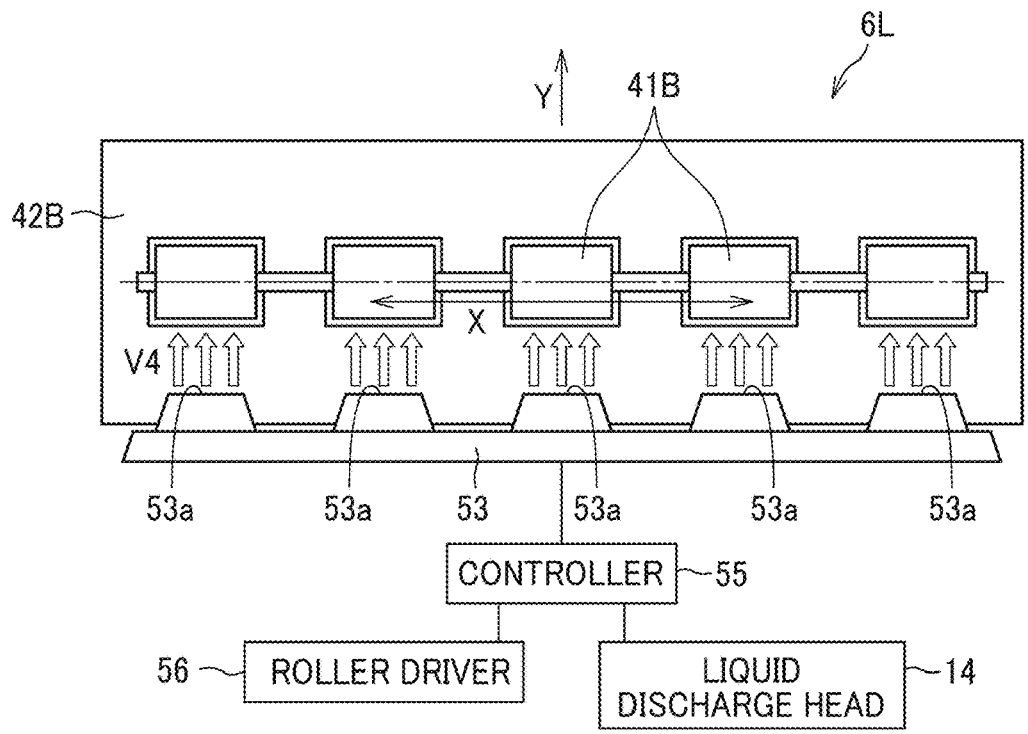
FIG. 19 is a plan view of the conveyance device depicted in FIG. 18, illustrating an increased amount of warm air discharged from the duct of the conveyance device.

FIGS. 18 and 19 illustrate a plan view of a dryer 6L according to a thirteenth embodiment of the present disclosure, illustrating a construction of the dryer 6L.

As illustrated in FIG. 18, the dryer 6L according to the thirteenth embodiment of the present disclosure includes a controller 5S disposed inside the body or the like of the image forming apparatus 100. The controller 55 changes an outlet area of each of the vents 53a. The controller 55 controls a rotation speed of various conveyance rollers, including the conveyance rollers 41A and 41B, that determines a sheet conveyance velocity at which various conveyance rollers convey the sheet P. The controller 55 also controls an ink discharge amount of ink discharged from the liquid discharge heads 14 onto the sheet P.

For example, if the conveyance roller 41B rotates at an increased rotation speed, that is, if the conveyance roller 41B rotates at an increased sheet conveyance velocity, a number of sheets P conveyed through the dryer 6L per unit time increases. Hence, as the sheets P are conveyed over the conveyance roller 41B, the sheets P draw heat from the conveyance roller 41B at an increased speed. Accordingly, if the conveyance roller 41B rotates at the increased rotation speed, the conveyance roller 41B of the dryer 6L may suffer from notable temperature decrease. If the liquid discharge heads 14 discharge ink onto the sheet P with an increased ink discharge amount, increased thermal energy is needed. Accordingly, as the sheets P are conveyed through the dryer 6L, the conveyance roller 41B may suffer from notable temperature decrease.

To address this circumstance, according to this embodiment, a wind velocity V4 of warm air sent from each of the vents 53a when the conveyance roller 41B rotates at the increased rotation speed or when the liquid discharge heads 14 discharge ink onto the sheet P with the increased ink discharge amount as illustrated in FIG. 19 is higher than a wind velocity V3 of warm air sent from each of the vents 53a when the conveyance roller 41B rotates at a decreased rotation speed or when the liquid discharge heads 14 discharge ink onto the sheet P with a decreased ink discharge amount as illustrated in FIG. 18. For example, based on data (e.g., a rotation speed) of a roller driver 56 that drives and rotates the conveyance roller 41B or an amount of ink discharged from the liquid discharge heads 14, the controller 55 decreases the outlet area of each of the vents 53a, increasing the wind velocity of warm air discharged from each of the vents 53a. Accordingly, heat is supplied to the conveyance roller 41B at an increased speed, suppressing temperature decrease of the conveyance roller 41B caused by conveyance of the sheet P. Additionally, the controller 55 decreases unevenness in surface temperature of the conveyance roller 41B in the rotation direction D41B thereof (e.g., the sheet conveyance direction Y) caused by conveyance of the sheet P. Thus, the controller 55 also decreases uneven drying of the sheet Pin the sheet conveyance direction Y thereof. Alternatively, instead of increasing the wind velocity of warm air, the controller 55 may increase an amount of warm air sent from the vents 53a to the conveyance roller 41B to increase a blow area on the conveyance roller 41B against which warm air blows. In this case also, heat is supplied to the conveyance roller 41B with an increased heat amount, suppressing temperature decrease of the conveyance roller 41B caused by conveyance of the sheet P. According to this embodiment, the controller 55 changes the wind velocity or the amount of warm air discharged from the vent 53a by changing the outlet area of the vent 53a. Alternatively, the controller 55 may change the wind velocity or the amount of warm air discharged from the vent 53a by changing the output (e.g., the rotation speed) of the fan 52 provided for each of the vents 53a.

In the dryers 6I, 6J, 6K, and 6L according to the embodiments described above with reference to FIGS. 15 to 19, warm air blows against the lower conveyance roller 41B of a conveyance roller pair constructed of the conveyance rollers 41A and 41B. Alternatively, warm air may blow against the upper conveyance roller 41A similarly in the dryers 6I, 6Q, 6K, and 6L according to the embodiments described above.

Figure 20:
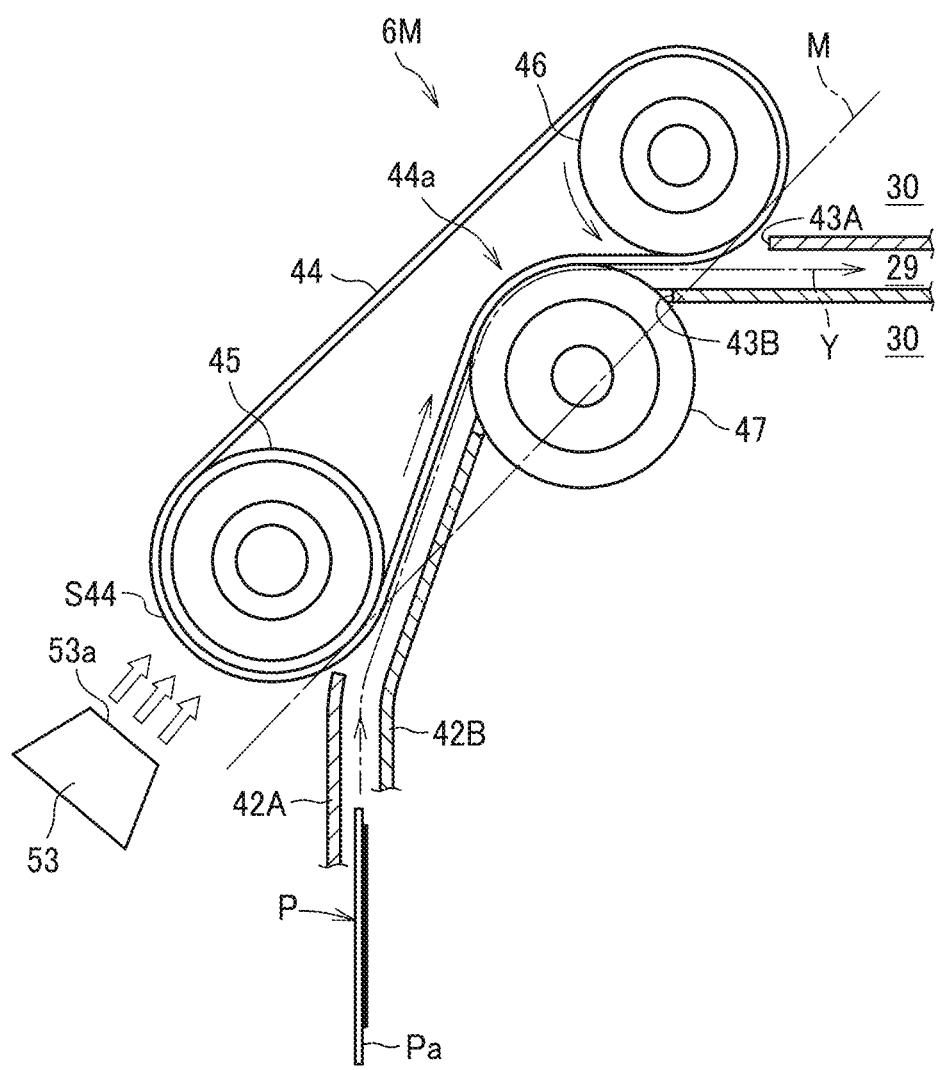
FIG. 20 is a side cross-sectional view of a conveyance device according to a fourteenth embodiment of the present disclosure, that is installable in the image forming apparatus depicted in FIG. 1.

FIG. 20 is a side cross-sectional view of a dryer 6M according to a fourteenth embodiment of the present disclosure, illustrating a construction of the dryer 6M.

As illustrated in FIG. 20, the dryer 6M according to the fourteenth embodiment of the present disclosure includes an endless, conveyance belt 44 serving as a conveyor that conveys the sheet P, instead of one of the conveyance rollers 41A and 41B. The conveyance belt 44 is looped over and supported by two support rollers 45 and 46. A conveyance roller 47 serving as another conveyor is pressed against the conveyance belt 44. A pressurization assembly such as a spring and a cam presses the conveyance roller 47 against the conveyance belt 44 toward an interior of the conveyance belt 44, that is, an interior of a common tangent M that abuts on an outer circumferential surface of each of the support rollers 45 and 46. Thus, the pressurization assembly forms a curved portion 44a of the conveyance belt 44, that is curved along an outer circumferential surface of the conveyance roller 47.

In the dryer 6M serving as a conveyance device having the construction described above, as the conveyance roller 47 or one of the support rollers 45 and 46 is driven and rotated, the conveyance belt 44 rotates in accordance with rotation of the conveyance roller 47 or one of the support rollers 45 and 46, thus conveying the sheet P. According to this embodiment, the duct 53 guides warm air inside the image forming apparatus 100. The warm air is sent to an outer face S44 of the conveyance belt 44 through the vent 53a of the duct 53. Thus, the warm air warms the outer face S44 of the conveyance belt 44. While the conveyance belt 44 conveys the sheet P, the conveyance belt 44 that is warmed heats the sheet P, facilitating drying of the liquid adhesion face Pa of the sheet P.

According to this embodiment, since the conveyance belt 44 is used as a conveyor, compared to the embodiments described above in which the conveyance roller pair constructed of the conveyance rollers 41A and 41B is used as the conveyor, the sheet P contacts the conveyance belt 44 serving as the conveyor that is warmed for an increased time period. Accordingly, the dryer 6M according to the fourteenth embodiment increases an amount of heat supplied to the sheet P, improving drying performance for drying the sheet P. According to this embodiment, warm air sent from the duct 53 blows against the outer face S44 of the conveyance belt 44. Alternatively, warm air may blow against the outer circumferential surface of the conveyance roller 47.

The above describes the embodiments of the present disclosure. However, the technology of the present disclosure is not limited to the embodiments described above and is modified within the scope of the present disclosure.

The above describes the embodiments in which heat generated by the heat radiators, that is, the driver 36, the power supply 37, and the electrical component 38 situated in the rear chamber 10, is supplied to a dryer (e.g., the dryers 6, 6A, 6B, 6C, 6D, 6E, 6F, 6G, 6H, 6I, 6J, 6K, 6L, and 6M), as examples. However, heat used for drying the sheet P is not limited to heat generated by the heat radiators and may be heat generated by other heat radiators.

A conveyance device applied with any one of the embodiments of the present disclosure is not limited to a conveyance device that conveys cut paper as the sheet P described above in the embodiments. Each of the embodiments of the present disclosure may also be applied to a conveyance device that draws and conveys a long sheet from a sheet roll.

An image forming apparatus applied with any one of the embodiments of the present disclosure is not limited to the image forming apparatus 100 depicted in FIG. 1. For example, each of the embodiments of the present disclosure is also applicable to image forming apparatuses 10A and 10B illustrated in FIGS. 21 and 22, respectively.

The following describes constructions of the image forming apparatuses 100A and 100B, respectively, to which each of the embodiments of the present disclosure is applicable.

The constructions of the image forming apparatuses 100A and 100B, respectively, are described mainly for a part that is not shared by the image forming apparatus 100 depicted in FIG. 1. A description of other part that is shared by the image forming apparatus 100 and therefore is described above is omitted.

Figure 21:
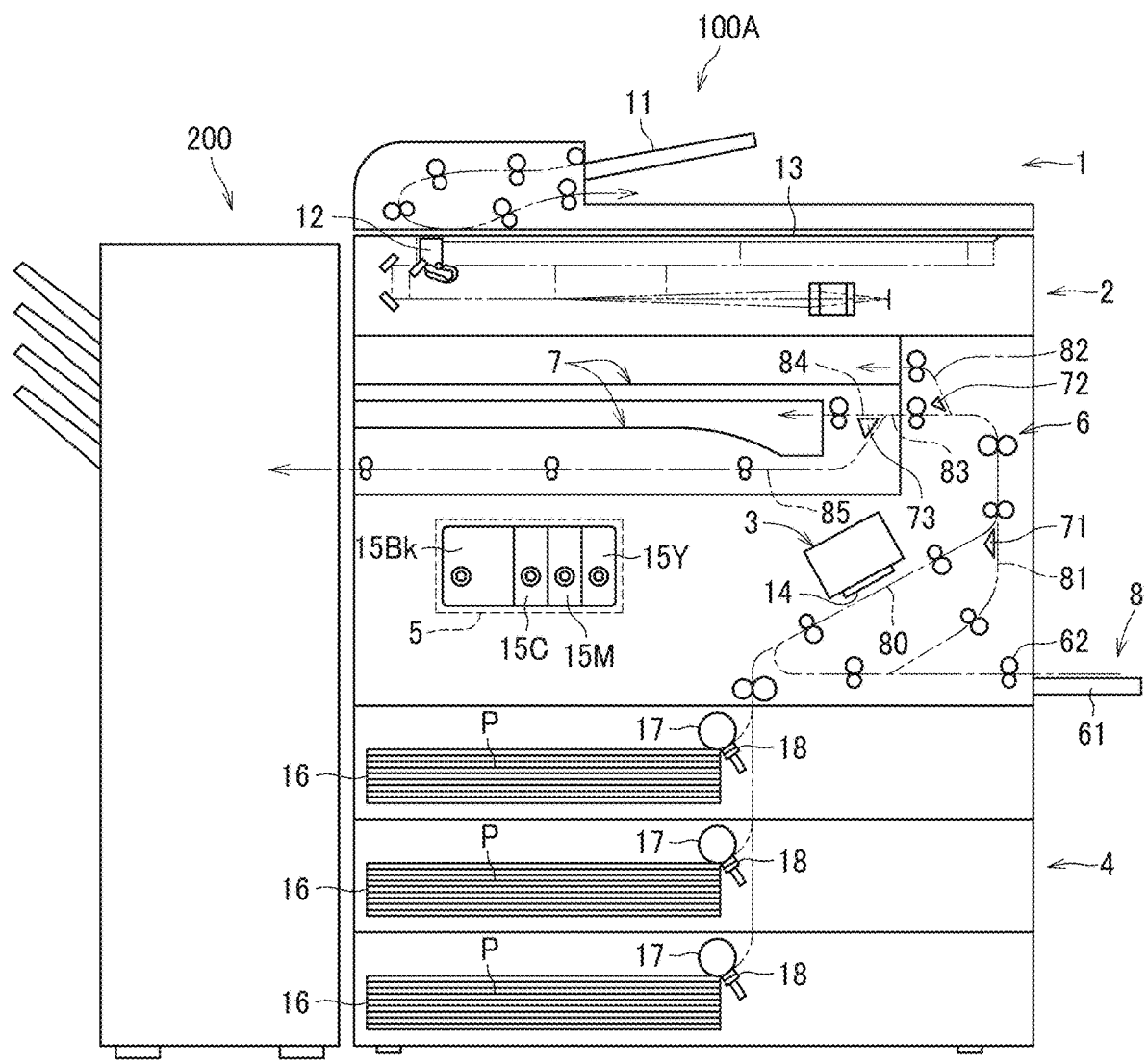
FIG. 21 is a schematic cross-sectional view of an image forming apparatus as a first variation of the image forming apparatus depicted in FIG. 1.

Like the image forming apparatus 100 depicted in FIG. 1 and described above in the embodiments, the image forming apparatus 10A illustrated in FIG. 21 includes the original conveyance device 1, the scanner 2, the image forming device 3, the sheet supply 4, the cartridge holder 5, the dryer 6, and the sheet ejection portion 7. The image forming apparatus 100A further includes a bypass sheet supply 8. Unlike the image forming device 3 depicted in FIG. 1, the image forming device 3 depicted in FIG. 21 is disposed opposite a conveyance path 80 inclined with respect to a horizontal direction in FIG. 21 such that a sheet P is conveyed obliquely with respect to the horizontal direction through the conveyance path 80.

The bypass sheet supply 8 includes a bypass tray 61 and a feed roller 62. The bypass tray 61 serves as a table where a sheet P is placed. The feed roller 62 serves as a feeder that feeds the sheet P from the bypass tray 61. The bypass tray 61 is attached to a body of the image forming apparatus 100A. As the bypass tray 61 pivots, the bypass tray 61 is opened and closed with respect to the body of the image forming apparatus 100A. As a user opens the bypass tray 61 as illustrated in FIG. 21, the user places the sheet P on the bypass tray 61 so that the feed roller 62 feeds the sheet P.

When the image forming apparatus 100A depicted in FIG. 21 receives an instruction to start a print job, the sheet supply 4 or the bypass sheet supply 8 supplies a sheet P that is conveyed to the image forming device 3. When the sheet P reaches the image forming device 3, the liquid discharge heads 14 discharge ink onto the sheet P, forming an image on the sheet P.

If the print job instructs duplex printing, after the sheet P passes the image forming device 3, the sheet P is conveyed in an opposite direction. A first path switch 71 guides the sheet P to a reverse conveyance path 81. The sheet P passes through the reverse conveyance path 81 and is conveyed to the image forming device 3 again in a state in which the sheet P is reversed. The image forming device 3 forms an image on the back side of the sheet P.

The sheet P bearing the image on one side (e.g., the front side) or both sides (e.g., the front side and the back side) thereof is conveyed to the dryer 6 that dries ink on the sheet P. A second path switch 72 selectively guides the sheet P that is past the dryer 6 to a conveyance path 82 directed to an upper stage of the sheet ejection portion 7 or a conveyance path 83 directed to a lower stage of the sheet ejection portion 7. If the sheet P is guided to the conveyance path 82 directed to the upper stage of the sheet ejection portion 7, the sheet P is ejected onto the upper stage of the sheet ejection portion 7. Conversely, if the sheet P is guided to the conveyance path 83 directed to the lower stage of the sheet ejection portion 7, a third path switch 73 selectively guides the sheet P to a conveyance path 84 directed to the lower stage of the sheet ejection portion 7 or a conveyance path 85 directed to the post-processing apparatus 200.

If the sheet P is guided to the conveyance path 84 directed to the lower stage of the sheet ejection portion 7, the sheet P is ejected onto the lower stage of the sheet ejection portion 7. Conversely, if the sheet P is guided to the conveyance path 85 directed to the post-processing apparatus 200, the sheet P is conveyed to the post-processing apparatus 200 where the sheet P is treated with post-processing.

Figure 22:
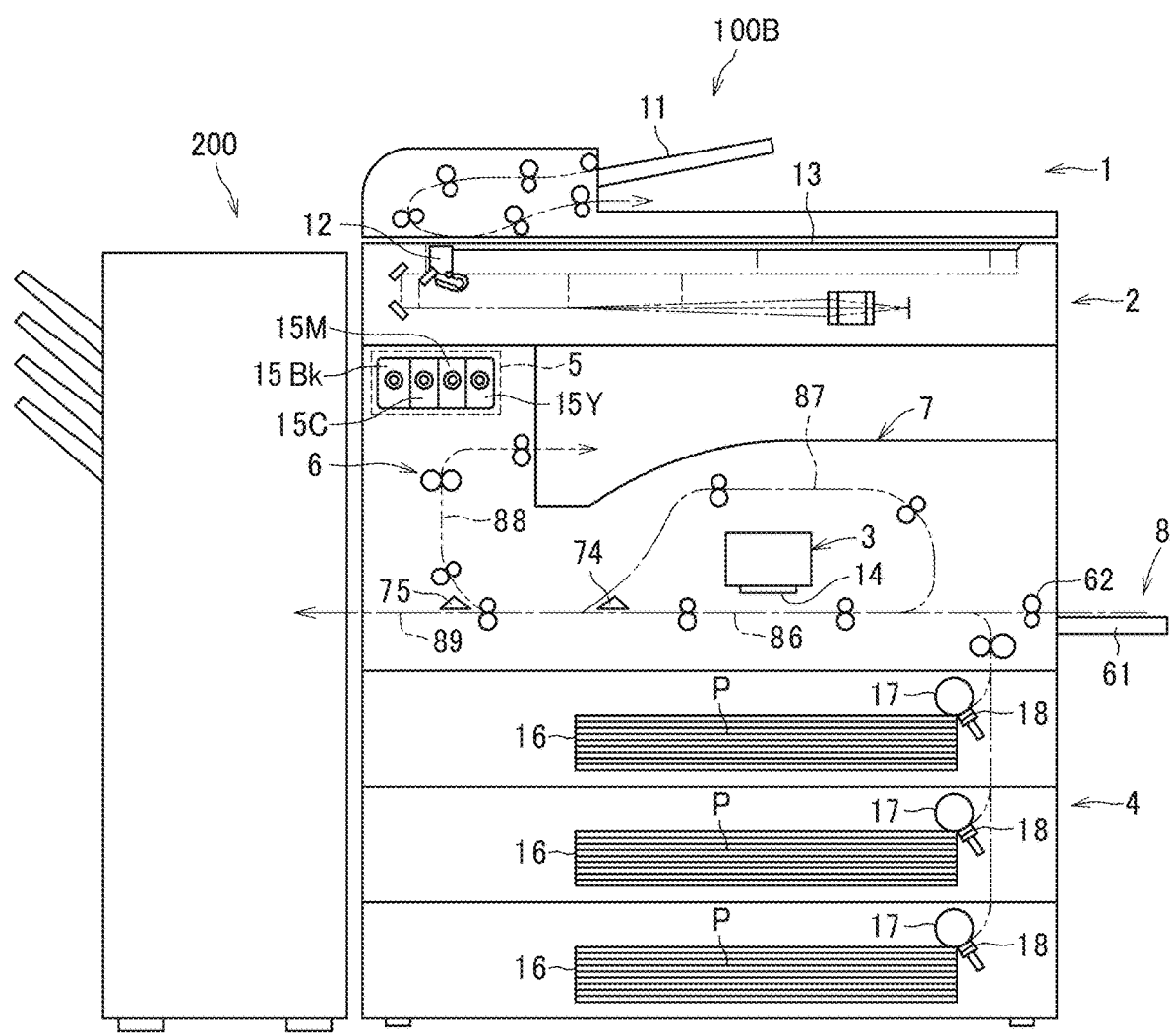
FIG. 22 is a schematic cross-sectional view of an image forming apparatus as a second variation of the image forming apparatus depicted in FIG. 1.

Like the image forming apparatus 100A depicted in FIG. 21, the image forming apparatus 100B illustrated in FIG. 22 includes the original conveyance device 1, the scanner 2, the image forming device 3, the sheet supply 4, the cartridge holder 5, the dryer 6, the sheet ejection portion 7, and the bypass sheet supply 8. Like the image forming device 3 depicted in FIG. 1, the image forming device 3 depicted in FIG. 22 is disposed opposite a conveyance path 86 extended in a horizontal direction in FIG. 22 such that a sheet P is conveyed in the horizontal direction through the conveyance path 86.

When the image forming apparatus 100B depicted in FIG. 22 receives an instruction to start a print job, the sheet supply 4 or the bypass sheet supply 8 supplies a sheet P that is conveyed to the image forming device 3. When the sheet P reaches the image forming device 3, the liquid discharge heads 14 discharge ink onto the sheet P, forming an image on the sheet P.

If the print job instructs duplex printing, after the sheet P passes the image forming device 3, the sheet P is conveyed in an opposite direction. A first path switch 74 guides the sheet P to a reverse conveyance path 87. The sheet P passes through the reverse conveyance path 87 and is conveyed to the image forming device 3 again in a state in which the sheet P is reversed. The image forming device 3 forms an image on the back side of the sheet P.

A second path switch 75 selectively guides the sheet P bearing the image on one side (e.g., the front side) or both sides (e.g., the front side and the back side) thereof to a conveyance path 88 directed to the dryer 6 or a conveyance path 89 directed to the post-processing apparatus 200. If the sheet P is guided to the conveyance path 88 directed to the dryer 6, the dryer 6 dries ink on the sheet P. The sheet P that is past the dryer 6 is ejected onto the sheet ejection portion 7. Conversely, if the sheet P is guided to the conveyance path 89 directed to the post-processing apparatus 200, the sheet P is conveyed to the post-processing apparatus 200 where the sheet P is treated with post-processing.

Each of the image forming apparatus 100A depicted in FIG. 21 and the image forming apparatus 100B depicted in FIG. 22 is also applied with any one of the embodiments of the present disclosure, attaining advantages similar to the advantages described above. For example, the dryer 6 supplies warm air generated inside each of the image forming apparatuses 100A and 100B to an outer face of a conveyor such as the conveyance rollers 41A and 41B disposed in the dryer 6, thus drying the sheet P effectively while suppressing increase in power consumption.

Each of the embodiments of the present disclosure is also applicable to a post-processing apparatus or the like that performs post-processing on a sheet P adhered with liquid.

Figure 23:
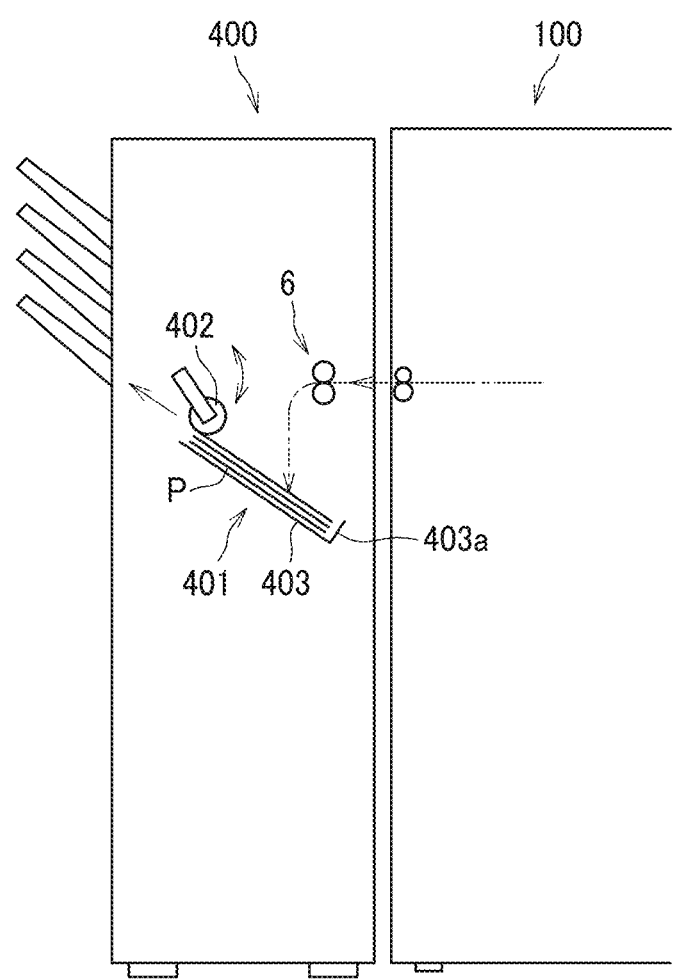
FIG. 23 is a schematic cross-sectional view of a post-processing apparatus incorporating the conveyance device depicted in FIG. 4.

FIG. 23 illustrates a post-processing apparatus 400 (e.g., a finisher) as an example of the post-processing apparatus to which any one of the embodiments of the present disclosure is applicable.

As illustrated in FIG. 23, the post-processing apparatus 400 includes the dryer 6 and a post-processing device 401 that performs post-processing on the sheet P that is past the dryer 6. When the post-processing apparatus 400 receives the sheet P conveyed from the image forming apparatus 100, the dryer 6 heats the sheet P. Thereafter, the sheet P is placed on amounting tray 403 of the post-processing device 401. If the post-processing apparatus 400 employs a face-up manner in which the sheets P are placed on the mounting tray 403 such that the image bearing face of each of the sheets P faces up, the sheets P are preferably formed with images in an image formation order in which an image is formed on a last page of the sheets P first so that the last page of the sheets P is placed on the mounting tray 403 first. A conveyance roller 402 of the post-processing device 401 rotates forward to convey the sheet P placed on the mounting tray 403 backward. Accordingly, the trailing edge of the sheet P strikes a trailing edge restrictor 403a of the mounting tray 403. Thus, the trailing edge restrictor 403a aligns the trailing edges of the sheets P. In order to prevent the conveyance roller 402 from disturbing ejection of the sheets P onto the mounting tray 403, the conveyance roller 402 moves from a contact position where the conveyance roller 402 contacts the sheet P to a retracted position where the conveyance roller 402 does not contact the sheet P. In a state in which the trailing edges of the sheets P are aligned, the post-processing device 401 performs post-processing such as stapling and punching on the sheets P. Thereafter, the conveyance roller 402 rotates backward to eject the sheets P placed on the mounting tray 403 to an outside of the post-processing apparatus 400.

The dryer 6 installed in the post-processing apparatus 400 is also applied with any one of the embodiments of the present disclosure. Thus, the dryer 6 dries the sheets P effectively while suppressing increase in power consumption.

The conveyance device according to any one of the embodiments of the present disclosure is not limited to a conveyance device installed in an inkjet image forming apparatus that discharges ink onto a sheet to form an image on the sheet or a conveyance device installed in a post-processing apparatus that performs post-processing on sheets onto which ink is discharged. For example, the conveyance device according to any one of the embodiments of the present disclosure may be a conveyance device installed in a liquid discharge apparatus that discharges process liquid onto a surface of a sheet to achieve an objective such as reforming the surface of the sheet. That is, a liquid discharge apparatus applied with any one of the embodiments of the present disclosure is an image forming apparatus that discharges ink that forms an image, a liquid discharge apparatus that discharges liquid that does not form an image, or the like. The conveyance device according to any one of the embodiments of the present disclosure may dry liquid (e.g., dew drops) that generates as an adverse reaction in an image forming apparatus employing an electrophotographic method.

According to the embodiments of the present disclosure, a sheet (e.g., the sheet P) adhered with liquid denotes an object to which liquid adheres at least temporarily. For example, the liquid is adhered and fixed to the object or is adhered to and permeated into the object. Specifically, the sheet may be paper, resin film, wall paper, an electronic substrate, or the like. The sheet may be made of paper, leather, metal, plastic, glass, wood, ceramics, or the like. The sheet adhered with liquid may be continuous paper (e.g., a roll of a medium). However, if the sheet is a cut medium, the conveyance device according to any one of the embodiments of the present disclosure prevents an airflow from fluttering the cut medium more effectively.

A description is provided of advantages of a conveyance device (e.g., the dryers 6, 6A, 6B, 6C, 6D, 6E, 6F, 6G, 6H, 6I, 6J, 6K, 6L, and 6M).

As illustrated in FIGS. 3 and 20, the conveyance device includes a conveyor (e.g., the conveyance rollers 41A and 41B, the conveyance belt 44, and the conveyance roller 47), a heat radiator (e.g., the driver 36, the power supply 37, and the electrical component 38), and a ventilator (e.g., the ventilator 51).

As illustrated in FIG. 4, the conveyor has an outer face (e.g., the outer face S) that contacts a sheet (e.g., the sheet P) adhered with liquid. The conveyor conveys the sheet. The ventilator sends air generated by the heat radiator to the outer face of the conveyor. Accordingly, the conveyance device suppresses increase in power consumption and dries the sheet effectively.

According to the embodiments described above, each of the image forming apparatuses 100, 100A, and 100B is a copier. Alternatively, each of the image forming apparatuses 10, 100A, and 100B may be a printer, a facsimile machine, a multifunction peripheral (MFP) having at least two of printing, copying, facsimile, scanning, and plotter functions, an inkjet recording apparatus, or the like.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A conveyance device comprising:
a conveyor having an outer face configured to contact a sheet adhered with liquid, the conveyor configured to convey the sheet;
a heat radiator configured to generate air; and
a ventilator configured to send the air to the outer face of the conveyor.

2. The conveyance device according to claim 1, further comprising:
a guide configured to guide the sheet in a sheet conveyance direction;
a conveyance path defined by the guide;
a conveyance path exterior disposed outside the guide; and
a conveyance path interior disposed inside the guide,
wherein the conveyor is configured to span the conveyance path exterior and the conveyance path interior, and
wherein the ventilator is disposed in the conveyance path exterior.

3. The conveyance device according to claim 2,
wherein the guide has a through hole in which the conveyor is disposed, and
wherein a clearance is provided between an edge of the through hole and the outer face of the conveyor.

4. The conveyance device according to claim 2,
wherein the conveyor is configured to rotate in a rotation direction to convey the sheet.

5. The conveyance device according to claim 4,
wherein the ventilator is configured to send the air to the outer face of the conveyor in a downstream region of the conveyor in the sheet conveyance direction.

6. The conveyance device according to claim 4,
wherein the ventilator is configured to send the air to the outer face of the conveyor in an upstream region of the conveyor in the sheet conveyance direction.

7. The conveyance device according to claim 2,
wherein the ventilator is configured to send the air to the conveyor in an airflow direction away from the guide.

8. The conveyance device according to claim 1, further comprising:
another conveyor having an outer face configured to contact a first side of the sheet; and
another ventilator configured to send the air to the outer face of said another conveyor,
wherein the conveyor is configured to contact a second side of the sheet opposite the first side of the sheet.

9. The conveyance device according to claim 1,
wherein the ventilator is configured to send the air to the conveyor in an airflow direction and the conveyor is configured to convey the sheet in a sheet conveyance direction, and
wherein the airflow direction is at an acute angle to the sheet conveyance direction.

10. The conveyance device according to claim 1, further comprising a cover disposed opposite the outer face of the conveyor with a gap between the cover and the outer face of the conveyor.

11. The conveyance device according to claim 1, further comprising another conveyor having an outer face configured to contact a first side of the sheet, said another conveyor shifted from the conveyor in a sheet conveyance direction in which the conveyor conveys the sheet,
wherein the conveyor is configured to contact a second side of the sheet opposite the first side of the sheet.

12. The conveyance device according to claim 1,
wherein the ventilator includes:
a first vent; and
a second vent arranged with the first vent in a direction perpendicular to a sheet conveyance direction in which the conveyor conveys the sheet.

13. The conveyance device according to claim 12,
wherein the first vent is configured to discharge the air in a first discharge amount and the second vent is configured to discharge the air in a second discharge amount different from the first discharge amount.

14. The conveyance device according to claim 12, wherein the first vent is configured to discharge the air at a first wind velocity and the second vent is configured to discharge the air at a second wind velocity different from the first wind velocity.

15. The conveyance device according to claim 12, further comprising a controller configured to change one of a discharge amount and a wind velocity of the air discharged from each of the first vent and the second vent.

16. The conveyance device according to claim 1, further comprising:
a first chamber configured to accommodate the conveyor; and
a second chamber configured to accommodate the heat radiator and separated from the first chamber.

17. The conveyance device according to claim 16,
wherein the conveyer includes one of a roller and an endless belt,
wherein the heat radiator includes at least one of a driver, a power supply, or an electrical component, and
wherein the ventilator includes:
a duct disposed in the first chamber and configured to send the air to the conveyer; and
a fan configured to send the air inside the second chamber into the duct.

18. A liquid discharge apparatus comprising:
a liquid discharger configured to discharge liquid onto a sheet; and
a conveyance device configured to convey the sheet,
the conveyance device including:
a conveyor having an outer face configured to contact the sheet adhered with the liquid, the conveyor configured to convey the sheet;
a heat radiator configured to generate air; and
a ventilator configured to send the air to the outer face of the conveyor.

19. The liquid discharge apparatus according to claim 18, wherein the liquid discharger is configured to discharge the liquid onto the sheet to form an image on the sheet.

20. A post-processing apparatus comprising:
a conveyance device including:
a conveyor having an outer face configured to contact a sheet adhered with liquid, the conveyor configured to convey the sheet;
a heat radiator configured to generate air; and
a ventilator configured to send the air to the outer face of the conveyor; and
a post-processing device configured to perform post-processing on the sheet conveyed from the conveyance device.

* * * * *